(12) United States Patent
Teranishi et al.

(10) Patent No.: US 11,380,911 B2
(45) Date of Patent: Jul. 5, 2022

(54) ELECTROCHEMICAL DEVICE

(71) Applicants: SOKEN, INC., Nisshin (JP); DENSO CORPORATION, Kariya (JP); NATIONAL UNIVERSITY CORPORATION NAGOYA UNIVERSITY, Nagoya (JP)

(72) Inventors: Shinya Teranishi, Nisshin (JP); Mai Fukui, Nisshin (JP); Ryohei Yamamoto, Nisshin (JP); Tetsuya Hori, Nisshin (JP); Ikuna Nishikawa, Nisshin (JP); Hiroo Imamura, Kariya (JP); Takashi Hibino, Nagoya (JP); Masahiro Nagao, Nagoya (JP)

(73) Assignees: SOKEN, INC., Nisshin (JP); DENSO CORPORATION, Kariya (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 149 days.

(21) Appl. No.: 16/828,148

(22) Filed: Mar. 24, 2020

(65) Prior Publication Data
US 2020/0313204 A1    Oct. 1, 2020

(30) Foreign Application Priority Data
Mar. 25, 2019   (JP) .............................. JP2019-056474

(51) Int. Cl.
*H01M 8/0267*   (2016.01)
*H01M 4/96*   (2006.01)

(52) U.S. Cl.
CPC ........... *H01M 8/0267* (2013.01); *H01M 4/96* (2013.01); *H01M 2300/0008* (2013.01); *H01M 2300/0011* (2013.01)

(58) Field of Classification Search
CPC ................ H01M 8/0267; H01M 4/96; H01M 2300/0008; H01M 2300/0011; H01M 8/04067; H01M 8/04186; H01M 8/04201
See application file for complete search history.

(56) References Cited

U.S. PATENT DOCUMENTS

| 2002/0087037 A1 | 7/2002 | Kaneko et al. |
| 2017/0130348 A1 | 5/2017 | Mei et al. |

(Continued)

FOREIGN PATENT DOCUMENTS

| JP | 2019-157172 | 9/2019 |

OTHER PUBLICATIONS

Liu, et al. "High efficiency hydrogen evolution from native biomass electrolysis," Article in Energy & Environmental Science • Jan. 2015, This journal is © The Royal Society of Chemistry 2016, www.researchgate.net/publication/287806473; www.rsc.org/ees Oct. 2, 2015 (7 pages).

(Continued)

*Primary Examiner* — Stewart A Fraser
(74) *Attorney, Agent, or Firm* — Nixon & Vanderhye PC

(57) ABSTRACT

An electrochemical device has an electrochemical cell provided with an electrolyte having proton conductivity, an anode provided on one side of the electrolyte, and a cathode provided on the other side of the electrolyte. The electrochemical device is configured so that a solution containing water, an artificial synthetic resin, and an acid is supplied to the anode. The electrochemical device is configured so that an oxygen-containing gas is supplied to the cathode and connecting a load between the anode and the cathode. The electrochemical device is configured so that the inert gas is supplied to the cathode and connecting the voltage application unit between the anode and the cathode.

14 Claims, 19 Drawing Sheets

(56) References Cited

U.S. PATENT DOCUMENTS

2017/0190379 A1* 7/2017 Ryschon .................. B62K 7/04
2017/0263945 A1* 9/2017 Li ...................... H01M 4/9083

OTHER PUBLICATIONS

Du, et al. "Low-Energy Catalytic Electrolysis for Simultaneous Hydrogen Evolution and Lignin Depolymerization", ChemPubSoc, Europe, ChemSusChem 2017, 10, pp. 847-854, Wiley Online Library, Jan. 19, 2017, (8 pages).

Gogoi, et al. "Low-temperature, Low-Energy, and High-Efficiency Pretreatment Technology for Large Wood Chips with a Redox Couple Catalyst", ChemPubSoc Europe, ChemSusChem 2018, 11, 1121-1131, Wiley Online Library, Mar. 22, 2018, (11 pages).

Hori, et al., "Fuel cell and electrolyzer using plastic waste directly as fuel", Graduate School of Environmental Studies, Nagoya University, Nagoya Japan, Feb. 1, 2020 (26 pages).

Hibino, et al. "Hydrogen Production by Direct Lignin Electrolysis at Intermediate Temperatures", ChemPubSoc, Europe, ChemElectroChem 2017, 4, 1-6, Wiley Online Library, Oct. 17, 2017 (6 pages).

Hori, et al., Supplementary Information "Fuel cell and electrolyzer using plastic waste directly as fuel", Graduate School of Environmental Studies, Nagoya University, Nagoya Japan, Feb. 1, 2020 (15 pages).

* cited by examiner

ELECTROCHEMICAL DEVICE

CROSS-REFERENCE TO RELATED APPLICATION

This application is based on and claims the benefit of priority from earlier Japanese Patent Application No. 2019-56474 filed Mar. 25, 2019, the description of which is incorporated herein by reference.

BACKGROUND

1. Technical Field

The present disclosure relates to an electrochemical device.

2. Related Art

An electrochemical device has an electrochemical cell provided with an electrolyte, an anode provided on one side of the electrolyte, and a cathode provided on the other side of the electrolyte. For example, a hydrogen generator as an electrochemical device is known, which is provided with an electrochemical cell composed of an anode, an electrolyte having proton conductivity, and a cathode.

SUMMARY

The present disclosure provides an electrochemical device. An aspect of the present disclosure is an electrochemical device including an electrochemical cell provided with an electrolyte having proton conductivity, an anode provided on one side of the electrolyte, and a cathode provided on the other side of the electrolyte. The electrochemical device is configured so that a solution containing water, an artificial synthetic resin, and an acid is supplied to the anode.

DETAILED DESCRIPTION OF THE PREFERRED EMBODIMENTS

Figure 1:
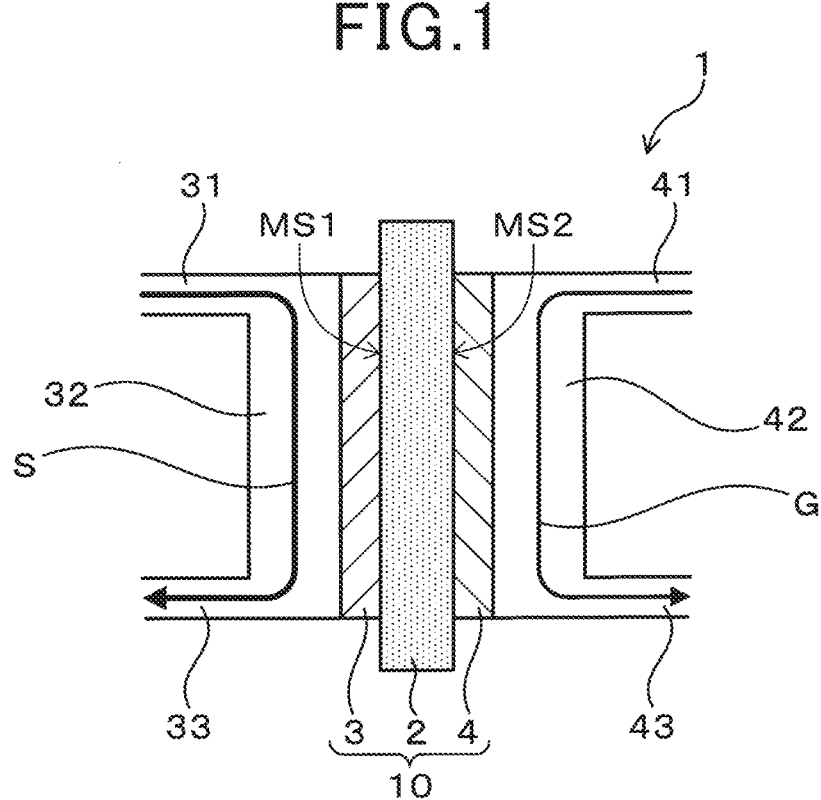
FIG. 1 is a diagram schematically illustrating an electrochemical device of a first embodiment.

For example, the disclosed Non-patent Literature (ChemElectroChem 2017, 4, 3032-3036) discloses a hydrogen generator as an electrochemical device which is provided with an electrochemical cell composed of an anode, an electrolyte having proton conductivity, and a cathode, and directly electrolyzes a saccharide supplied to the anode to generate hydrogen in the cathode.

Artificial synthetic resins have been used in numerous fields. The artificial synthetic resins are generally solids which do not degrade easily. Therefore, the disposal of artificial synthetic resin causes various environmental problems including the contamination of landfills and oceans by the artificial synthetic resins. Obtaining heat due to the incineration of artificial synthetic resin is widely known as a method for utilizing the used artificial synthetic resin. However, there is the risk that this method may emit harmful substances into the atmosphere. Therefore, the development of a method for effectively disposing of artificial synthetic resins different from the known method has been desired.

The present disclosure has been made in view of such problems, and the object of the present disclosure is to provide an electrochemical device which can effectively use an artificial synthetic resin electrochemically.

An aspect of the present disclosure is an electrochemical device including an electrochemical cell provided with an electrolyte having proton conductivity, an anode provided on one side of the electrolyte, and a cathode provided on the other side of the electrolyte. The electrochemical device is configured so that a solution containing water, an artificial synthetic resin, and an acid is supplied to the anode.

The electrochemical device has the aforementioned configuration. The artificial synthetic resin in the solution which is supplied to the anode is dissolved by the acid. The dissolved artificial synthetic resin is oxidized to an oxidation product, protons ($H^+$), and electrons by anode polarization. Since the electrochemical cell includes an electrolyte having proton conductivity, the generated protons can be extracted. Herein, the electrochemical device may function as a fuel cell using the artificial synthetic resin as a fuel by being configured so as to supply the cathode with an oxygen-containing gas and connecting a load between the anode and the cathode. On the one hand, the electrochemical device may function as a hydrogen generator which generates hydrogen on the cathode side by electrolysis using an artificial synthetic resin as a fuel by being configured so as to supply the cathode with an inert gas and connecting a voltage application unit between the anode and the cathode. Therefore, the electrochemical device can effectively use the artificial synthetic resin electrochemically as a fuel.

It is to be noted that the reference numerals in parentheses described in the claims indicate correspondence relationships with specific means described in embodiments described later and do not limit the technical scope of the present disclosure.

The above and other objectives, features and advantages of the present disclosure will be made more clear by the following detailed description, given referring to the appended drawings.

Hereinafter, embodiments of the present disclosure will be described with reference to the drawings.

First Embodiment

Figure 2:
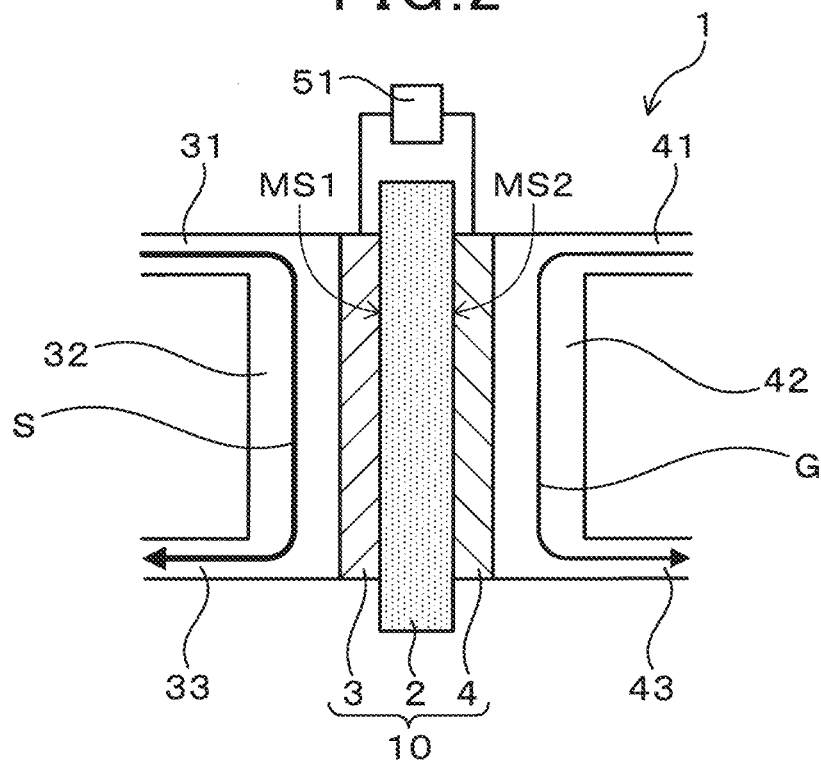
FIG. 2 is a diagram describing the case when the electrochemical device of the first embodiment functions as a fuel cell.
Figure 3:
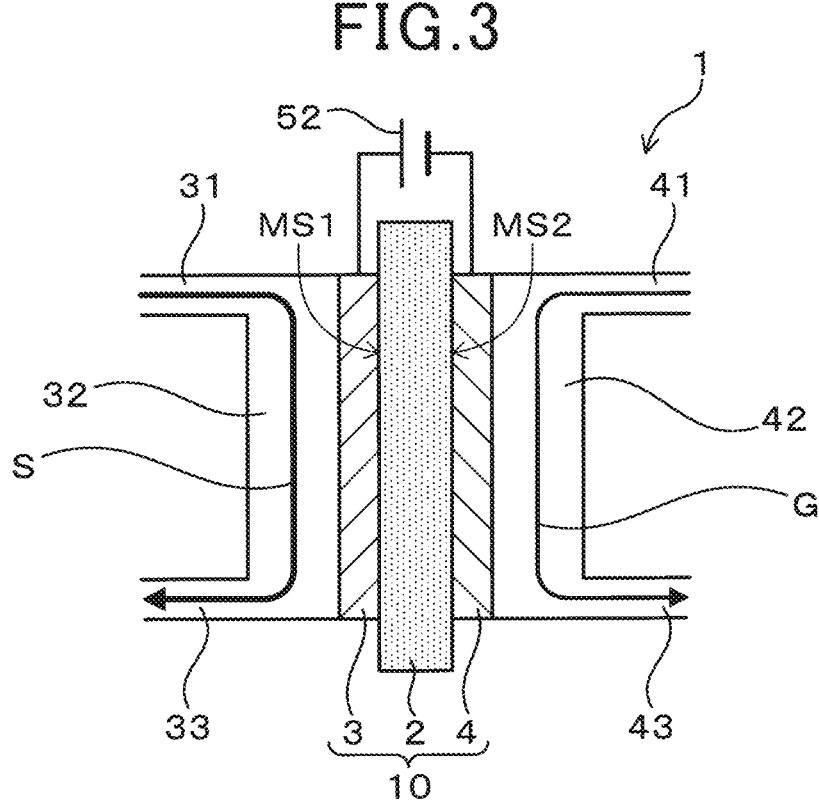
FIG. 3 is a diagram describing the case when the electrochemical device of the first embodiment functions as a hydrogen generator.

The electrochemical device of the first embodiment will be explained using FIGS. 1 to 3. As exemplified in FIG. 1, an electrochemical device 1 of the present embodiment has an electrochemical cell 10 provided with an electrolyte 2 having proton conductivity, an anode 3 provided on one side of the electrolyte 2 and a cathode 4 provided on the other side of the electrolyte 2. If the electrolyte 2 is formed in a plate shape, the electrolyte 2 has a first and second major surfaces MS1 and MS2 as shown in FIG. 1. In this case, the electrochemical device 1 of the present embodiment has the electrochemical cell 10 provided with the electrolyte 2 having proton conductivity, the anode 3 provided on the first major surface MS1 of the electrolyte 2 and the cathode 4 provided on the second major surface MS2 of the electrolyte 2. The electrochemical device 1 is configured so that a solution S containing water, an artificial synthetic resin, and an acid is supplied to the anode 3. The configuration will be described in detail below.

The electrolyte 2 can be configured to specifically include a proton conductor. The electrolyte 2, more specifically, may be configured by a proton conductor, and may be configured by a proton conductor and an aprotic conductor. The aprotic conductor may, for example, be used with the proton conductor and play a role in forming the electrolyte 2 into a film. Examples of the proton conductor include, $SnP_2O_7$, $Sn_{1-x}In_xP_2O_7$, a proton conductive solid acid such as phosphoric acid-doped polybenzimidazole and the like. These can be used alone or in combination of two or more. Examples of the aprotic conductor include a fluororesin such as polytetrafluoroethylene (PTFE) and the like. These can be used alone or in combination of two or more.

The anode 3 and the cathode 4 may be, specifically, joined to the electrolyte 2, and may be brought into contact with the electrolyte 2. The former is preferable, from the viewpoint of the reduction of the ohmic resistance and the like.

Both the anode 3 and the cathode 4 can be configured to include carbon as the electrode material. Specifically, from the viewpoint of the improvement of the electrode reactivity, a mesoporous carbon having a mesoporous structure and the like can be suitably used as the carbon. The mesopore size of the mesoporous carbon can be measured by a transmission electron microscope (TEM). A noble metal may be supported on the carbon. Examples of the noble metal include platinum (Pt) group, gold (Au), silver (Ag), alloys thereof and the like. The Pt group is platinum (Pt), ruthenium (Ru), rhodium (Rh), palladium (Pd), osmium (Os) and iridium (Ir). From the viewpoint of having a high catalytic activity, Pt, Pt—Fe and the like are preferably used as the noble metal. It is to be noted that, the combination of the electrode materials in the anode 3 and the cathode 4 is not specifically limited. The combination of the electrode materials in the anode 3 and the cathode 4 may be a combination of the same electrode materials, or may be a combination of different electrode materials.

In the electrochemical device 1, the anode 3 can contain carbon particles having a carbonyl group, and the pore volume distribution of the carbon particles can be configured to have a peak pore size in the range of a pore size of not less than 2 nm and not more than 200 nm. The peak pore size is the pore size (diameter) when the pore volume distribution indicates a peak. The artificial synthetic resin which is supplied to the anode 3 has a poor comparative flowability, and a low diffusibility in the anode 3. Since this configuration improves the flowability and the diffusibility of the artificial synthetic resin in the anode 3, it is possible to reduce the electrode resistance, and accordingly, the performance of the electrochemical device 1 can be improved. From the viewpoint of reliably improving the effect, the pore volume distribution of the carbon particles can be configured so that the peak pore size is, preferably, in a range of not less than 3 nm and not more than 20 nm, more preferably, not less than 4 nm and not more than 18 nm, even more preferably, not less than 5 nm and not more than 15 nm. Further, the differential pore volume in the peak pore size can be made to 0.02 (cm$^3$/g) or more from the viewpoint of ensuring the pore volume distribution.

The introduction of the carbonyl group into the carbon particles can be performed by an oxidation reduction treatment and the like of the carbon particles. Examples of the oxidation reduction treatment include a method for reducing hydrogen after a nitric acid treatment. Further, the pore volume distribution of the carbon particles can be obtained using an automatic gas/vapor adsorption measurement instrument (BELSORP-28SA manufactured by Microtrac-BEL Corp, or its successor) to prepare an adsorption-desorption isotherm (adsorbed substance: $N_2$) and analyzing it by the Grand Canonical Monte Carlo (GCMC) method.

Herein, the electrochemical device 1 can be configured so that the solution S containing water, an artificial synthetic resin, and an acid is supplied to the anode 3.

Specifically, an acid-soluble resin can be used as the artificial synthetic resin. "acid-soluble" used herein includes resins which are dissolved by heating with an acid. Examples of the artificial synthetic resin include polyamides such as nylon, polyesters such as polyurethane, vinylon and polyethylene terephthalate (PET), polycarbonate, polyvinyl alcohol (PVA) and the like. The solution S may be prepared by, for example, adding a powdery artificial synthetic resin to an acid solution containing water and an acid and mixing. Heating may be appropriately performed during the preparation of the solution S.

Specifically, phosphoric acid, acetic acid, sulfuric acid and the like can be exemplified as the acid. These can be used alone or in combination of two or more. Since phosphoric acid has proton conductivity, it contributes to not only the dissolution of the artificial synthetic resin, but also to the electrochemical reaction. From the viewpoints of proton conductivity and thermal stability, the acid preferably includes phosphoric acid. In this case, the acid may be constituted from phosphoric acid, and may contain phosphoric acid and the other acids mentioned above.

The acid may, more specifically, contain phosphoric acid and sulfuric acid. This configuration makes it easy to dissolve many types of artificial synthetic resin compared to when the acid is configured from phosphoric acid. In short, even when using an artificial synthetic resin which is difficult to dissolve with phosphoric acid alone, the solubility of the artificial synthetic resin can be improved by adding sulfuric acid which is a strong acid. As a result, the electrolytic reaction of the artificial synthetic resin in the anode is promoted, and the cell resistance can be decreased. In this case, the mass ratio of phosphoric acid to sulfuric acid in the acid can be made to a range of 90:10 to 20:80. This configuration makes it easy to maintain a low cell resistance of the electrochemical cell 10. If the mass ratio of the sulfuric acid becomes smaller than 10, the effect which reduces the cell resistance due to the addition of sulfuric acid to the phosphoric acid tends to become smaller. On the one hand, when the mass ratio of the sulfuric acid is in excess of 80, the sulfuric acid becomes excessive, and in contrast, the cell resistance tends to increase and the effect which reduces the cell resistance due to the addition of the sulfuric acid to the phosphoric acid tends to become smaller. The mass ratio of phosphoric acid to sulfuric acid in the acid can preferably be in the range 80:20 to 25:75, and more preferably, 70:30 to 30:70.

The solution S preferably has a pH of less than 7. This configuration makes it easy to improve the dissolution of the artificial synthetic resin, and reduce the deposition of the dissolved artificial synthetic resin.

The solution S is preferably exposed to a temperature of 180° C. or more prior to being supplied to the anode 3. This configuration makes it easy for the heated acid to decompose the artificial synthetic resin, thus, an electrolytic reaction of the artificial synthetic resin is likely to occur. Examples of the method for exposing the solution S to a temperature of 180° C. or more prior to being supplied to the anode 3 include a method which provides the electrochemical device 1 with a heat source (not shown) for heating the solution S at the stage prior to being supplied to the anode 3, and heats the solution S to a temperature of 180° C. or more during the heating stage and the like. This method makes it easy to continuously operate the electrochemical device 1. An example of the heat source includes an electric heater. Other examples include a method for supplying the anode 3 with the solution heated outside of the electrochemical device 1 to a temperature of 180° C. or more. This method makes it possible to set the operating temperature of the electrochemical device 1 to 180° C. or more. It is to be noted that, in the aforementioned configuration, the solution S may be exposed to a temperature of 180° C. or more only one time prior to being supplied to the anode 3, or may be exposed more than one time to a temperature of 180° C. or more. It is to be noted that, from the viewpoint such as the durability of the electrochemical device 1, the temperature to which the solution S is exposed prior to being supplied to the anode 3 is set to, preferably, 200° C. or less.

In the present embodiment, the electrochemical device 1 has specifically, as exemplified in FIG. 1, a solution contact flow channel 32 with the anode 3 disposed herein for contacting the solution S to the anode 3, a solution supply flow channel 31 in communication with the solution contact flow channel 32 for supplying the solution S to the solution contact flow channel 32, and a solution discharge flow channel 33 in communication with the solution contact flow channel 32 for discharging the solution S from the solution contact flow channel 32. Further, the electrochemical device 1 has, specifically, as exemplified in FIG. 1, a gas contact flow channel 42 with the cathode 4 disposed herein for contacting the gas to the cathode 4, a gas supply flow channel 41 in communication with the gas contact flow channel 42 for supplying the gas to the gas contact flow channel 42, and a gas discharge flow channel 43 in communication with the gas contact flow channel 42 for discharging the gas from the gas contact flow channel 42.

When the electrochemical device 1 functions as a fuel cell, the electrochemical device 1 is configured so as to supply an oxygen-containing gas to the cathode 4. Examples of the oxygen-containing gas include oxygen, air and the like. Further, in this case, in the electrochemical device 1, a load 51 is connected between the anode 3 and the cathode 4 as exemplified in FIG. 2. Therefore, the electrochemical device 1 can function as a fuel cell which generates electrical power using an artificial synthetic resin as fuel.

One the one hand, when the electrochemical device 1 functions as a hydrogen generator, the electrochemical device 1 is configured so as to supply an inert gas to the cathode 4. Examples of the inert gas include Ar gas, nitrogen gas and the like. A low oxygen gas can be used in this manner because the function as a fuel cell is suppressed in order to ensure the function as a hydrogen generator. It is to be noted that, if the electrochemical device 1 can function as a hydrogen generator, a trace amount of oxygen may be included in the gas which is supplied to the cathode 4. Further, in this case, in the electrochemical device 1, a voltage application unit (power supply) 52 is connected between the anode 3 and the cathode 4, as exemplified in FIG. 3. A voltage application unit 52 is configured so that a voltage may be applied between the anode 3 and the cathode 4. Therefore, the electrochemical device 1 can function as a hydrogen generator for generating hydrogen using an artificial synthetic resin as fuel.

The operating temperature of the electrochemical device 1 can be set, specifically, from 160° C. to 250° C. This configuration can reliably ensure the electrolysis of the artificial synthetic resin, thus, the efficient use of the artificial synthetic resin as a fuel becomes easier to attain. From the viewpoint of the electrolytic property of the artificial synthetic resin and the like, the operating temperature is, preferably, 170° C. or more, more preferably, 180° C. or more, even more preferably, 190° C. or more. From the viewpoint of the corrosion resistance of constituent members and the like, the operating temperature is, preferably, 240° C. or less, more preferably, 230° C. or less, even more preferably, 220° C. or less.

The electrochemical device 1 has the aforementioned configuration. The artificial synthetic resin in the solution S which is supplied to the anode 3 is dissolved by the acid. The dissolved artificial synthetic resin is oxidized to an oxidation product, protons ($H^+$), and electrons by anode polarization. The electrochemical cell 10 has the electrolyte 2 having proton conductivity, thus, the generated protons can be extracted. Herein, the electrochemical device 1 may function as a fuel cell using the artificial synthetic resin as a fuel by being configured so that the oxygen-containing gas is supplied to the cathode 4 and connecting the load 51 between the anode 3 and the cathode 4. On the one hand, the electrochemical device 1 may function as a hydrogen generator which generates hydrogen on the cathode 4 side by electrolysis using the artificial synthetic resin as the fuel by being configured so that the inert gas is supplied to the cathode 4 and connecting the voltage application unit 52 between the anode 3 and the cathode 4. It is to be noted that the electrochemical device 1 may be able to be alternatively implemented in a fuel cell mode functioning as a fuel cell and in a hydrogen generation mode functioning as a hydrogen generator.

Therefore, the electrochemical device 1 can effectively use the artificial synthetic resin electrochemically as a fuel.

Second Embodiment

The electrochemical device of the second embodiment will be described using FIG. 4. It is to be noted that, among the reference numerals used in the second embodiment, the same reference numerals used in the previous embodiment, unless specifically indicated, refer to the same compositional elements in the previous embodiment.

Figure 4:
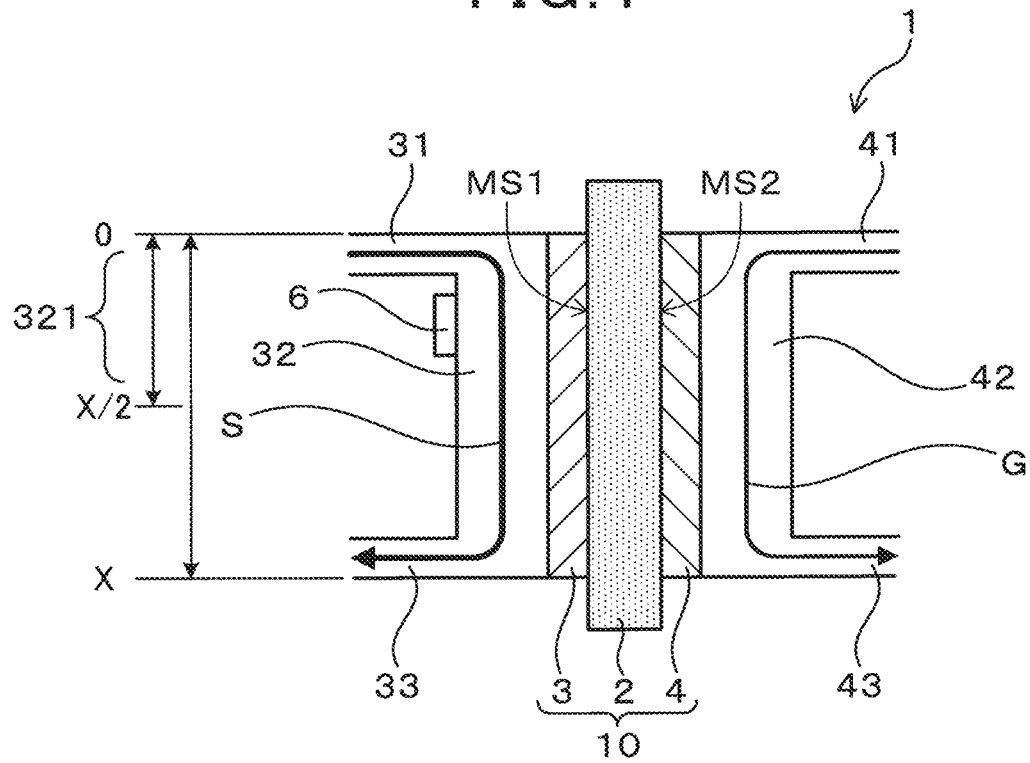
FIG. 4 is a diagram schematically illustrating a configuration of the electrochemical device of a second embodiment.

As exemplified in FIG. 4, the electrochemical device 1 of the present embodiment has the solution contact flow channel 32 with the anode 3 disposed herein for contacting the solution S to the anode 3. When the edge of the supply side of the solution S in the anode 3 is the origin 0, and the edge of the discharge side of the solution S in the anode 3 is X, the electrochemical device 1 has a temperature adjustment unit 6 which adjusts the temperature of the solution S in the solution contact flow channel (hereinafter, thus portion is simply referred to as the upstream solution contact flow channel 321) of the supply side of the solution S with respect to the center part which is X/2.

The artificial synthetic resin has the properties that it does not dissolve easily, the flowability is poor and it adheres easily to the anode 3. Further, the electrolytic reaction of the artificial synthetic resin in the anode 3 is an endothermic reaction. Therefore, when the operating temperature of the electrochemical device 1 is low, there is the risk that the temperature of the solution S decreases locally to at least the melting temperature of the artificial synthetic resin in the upstream solution contact flow channel 321 due to the endothermic reaction. If the temperature of the solution S of the upstream solution contact flow channel 321 decreases, there is the risk that the artificial synthetic resin will become adhered to the anode 3 which will impede the operation of the electrochemical device 1.

With respect thereto, when the electrochemical device 1 has the temperature adjustment unit 6, the temperature adjustment unit 6 anticipates the decrease of the temperature of the solution S due to the endothermic reaction, and it becomes possible to maintain the temperature of the solution S in the upstream solution contact flow channel 321 to a temperature of at least the melting temperature of the artificial synthetic resin. Therefore, according to the present embodiment, since it is possible to control the temperature of the solution S so that the melting temperature of the artificial synthetic resin does not decrease to the melting temperature, the electrochemical device 1 in which an artificial synthetic resin is continuously, directly and easily electrolyzed can be obtained.

The temperature adjustment unit 6 can be configured, for example, by providing a heat source such as a heater on the outer peripheral side surface of the upstream solution contact flow channel 321 as illustrated in FIG. 4. Since the temperature adjustment unit 6 is not in direct contact with the solution S, the configuration can prevent the adhesion of the artificial synthetic resin to the temperature adjustment unit 6. Further, the temperature adjustment unit 6 does not impede the flow of the solution S.

The temperature adjustment unit 6 can be configured so as to adjust the temperature of the solution S in the upstream solution contact flow channel 321 to 160° C. or more. The configuration can reliably prevent the deterioration of the anode 3 due to adhesion of the artificial synthetic resin, and can stably electrolyze the artificial synthetic resin. Other configurations, functions and effects are the same as those in the first embodiment.

Third Embodiment

Figure 5:
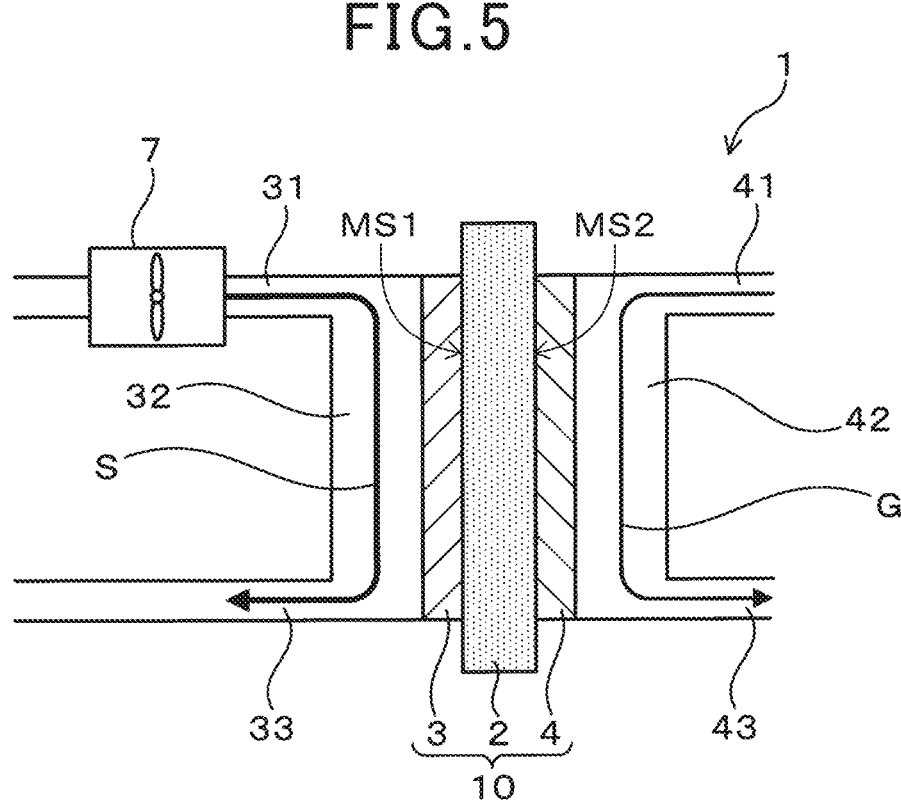
FIG. 5 is a diagram schematically illustrating a configuration of the electrochemical device of a third embodiment.

The electrochemical device of the third embodiment will be described using FIG. 5. As exemplified in FIG. 5, the electrochemical device 1 of the present embodiment has a stirring mechanism 7 which stirs the solution S prior to supplying the solution S to the anode 3.

Depending on the type of the artificial synthetic resin, an artificial synthetic resin which is partially insoluble in the solution S and is present in a solid state may be produced. There is the risk that such a solid artificial synthetic resin has a poor dispersibility, is partially aggregated, and may adhere to the surface of the anode 3 which causes the anode 3 to deteriorate.

With respect thereto, when the electrochemical device 1 has the stirring mechanism 7, the dispersibility of the undissolved artificial synthetic resin contained in the solution S can be improved. Therefore, the configuration can prevent aggregation of the solid artificial synthetic resin on the anode 3 surface and the deterioration of the anode 3 due to the adhesion, and it also becomes easy to supply a solid artificial synthetic resin to a reaction field of the anode 3 as a fuel. Therefore, according to the configuration, the availability of the supplied artificial synthetic resin increases, which is advantageous for improving the performance of the electrochemical device 1.

Specifically, ultrasonic waves, blade stirring, a mixer and the like can be used as the stirring mechanism 7. When the stirring mechanism 7 uses ultrasonic waves, since the constituent elements of the stirring mechanism 7 do not directly contact the solution S, an electrochemical device 1 having an excellent maintainability can be obtained. The stirring mechanism 7 can be provided, for example, in the solution supply flow channel 31. Other configurations, functions and effects are the same as those in the first embodiment.

Fourth Embodiment

Figure 6:
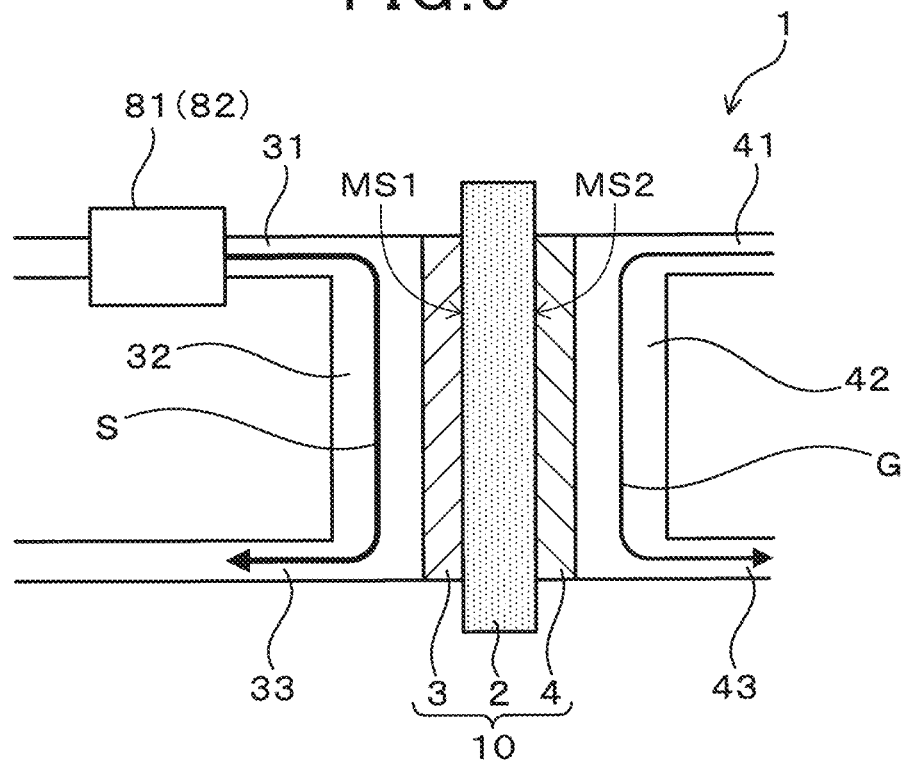
FIG. 6 is a diagram schematically illustrating a configuration of the electrochemical device of a fourth embodiment.

The electrochemical device of the fourth embodiment will be described using FIG. 6. As exemplified in FIG. 6, the electrochemical device 1 of the present embodiment can be configured to have a supply pressure adjustment mechanism 81 which changes the supply pressure of the solution S and supplies the solution S to the anode 3. Alternatively, the electrochemical device 1 can be configured to have a supply rate adjustment mechanism 82 which changes the supply rate of the solution S and supplies the solution S to the anode 3.

When the artificial synthetic resin which was dissolved by the acid reacts at the anode 3, there is the risk that the generated gases ($CO_2$ and the like) may be adsorbed on the anode 3 surface, the supply of the artificial synthetic resin to the anode 3 obstructed, and the performance of the electrochemical device 1 decrease with the elapse of time.

With respect thereto, when the electrochemical device 1 has the supply pressure adjustment mechanism 81, the desorption of the gas adsorbed on the anode 3 surface becomes possible by changing the supply pressure of the solution S. On the one hand, when the electrochemical device 1 has the supply rate adjustment mechanism 82, the desorption of the gas adsorbed on the anode 3 surface becomes possible by changing the supply rate of the solution S. Therefore, the aforementioned configuration can prevent the reduction of the performance of the electrochemical device 1 without limiting the supply of the artificial synthetic resin to the anode 3. It is to be noted that the electrochemical device 1 may have both the supply pressure adjustment mechanism 81 and the supply rate adjustment mechanism 82.

The supply pressure of the solution S by the supply pressure adjustment mechanism 81 and the supply rate of the solution S by the supply rate adjustment mechanism 82 can be controlled so as to change to, for example, a pulse form and the like. According to the configuration, it is easy to reliably ensure the desorption of the gas adsorbed on the anode 3 surface, which is advantageous in preventing the reduction of the performance of the electrochemical device 1. It is to be noted that, FIG. 6 illustrates an example in which the supply pressure adjustment mechanism 81 or the supply rate adjustment mechanism 82 is provided in the solution supply flow channel 31. Other configurations, functions and effects are the same as those in the first embodiment.

Fifth Embodiment

Figure 7:
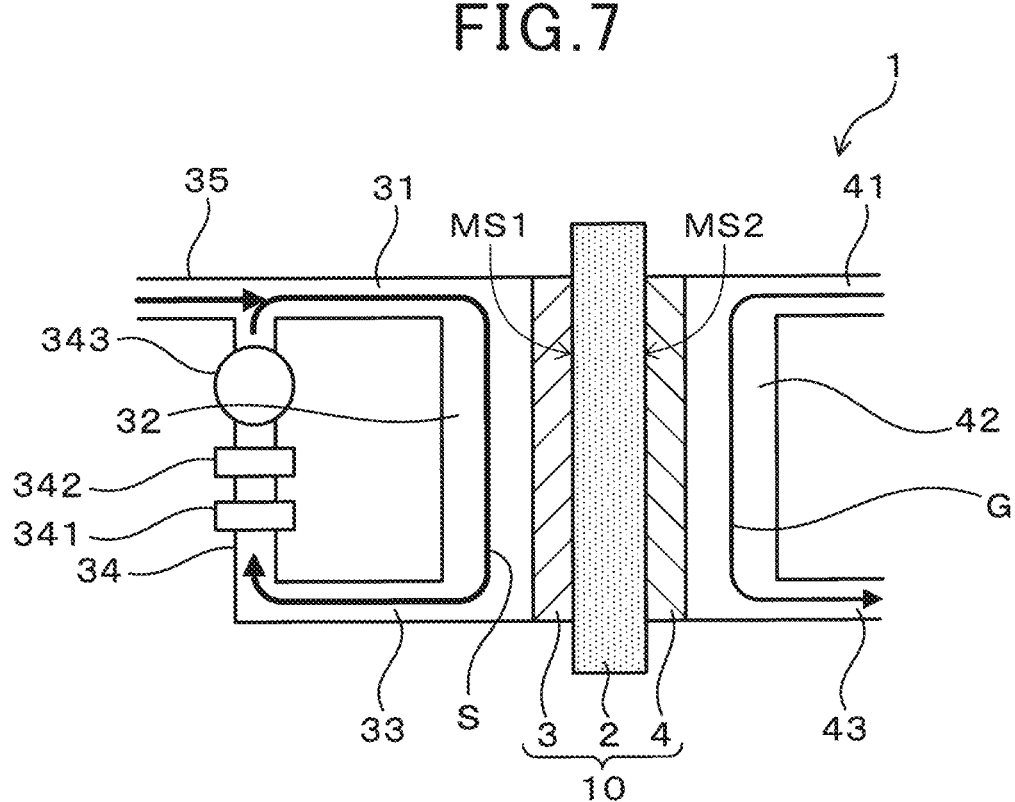
FIG. 7 is a diagram schematically illustrating a configuration of the electrochemical device of a fifth embodiment.

The electrochemical device of the fifth embodiment will be described using FIGS. 7 and 8. As exemplified in FIG. 7, the electrochemical device 1 of the present embodiment has a solution circulation flow channel 34 by which the solution S which is not used at the anode 3 is recirculated to the anode 3. In the present embodiment, the solution circulation flow channel 34 is, specifically, connected between the solution supply flow channel 31 and the solution discharge flow channel 33. In short, one end (first end) of the solution circulation flow channel 34 is in communication with the solution discharge flow channel 33, and the other end (second end) of the solution circulation flow channel 34 is in communication with the solution supply flow channel 31. The solution S passes through the solution supply flow channel 31 and is supplied to the solution contact flow channel 32 thereby. Moreover, the solution S which was not used at the anode 3 and the product due to the anode reaction are recovered through the solution discharge flow channel 33, and supplied again to the solution supply flow channel 31 through the solution circulation flow channel 34. It is to be noted that FIG. 7 illustrates an example in which a supply pipe 35 for introducing new solution S from the outside to the solution supply flow channel 31, and adding water which was consumed in the anode reaction is connected. Further, the circulation of the solution S is performed by, for example, providing a pump 343 and the like in the solution circulation flow channel 34.

Herein, the electrochemical device 1 can be configured to have a cooling unit 341 and a reheating unit 342 provided on the downstream side of the cooling unit 341 in the solution circulation flow channel 34. The cooling unit 341 deposits the artificial synthetic resin in the solution S by cooling, and adheres the deposited artificial synthetic resin to the inner wall surface of the solution circulation flow channel 34. The reheating unit 342 reheats the solution S which was cooled by the cooling unit 341.

Since the water is consumed when using the artificial synthetic resin at the anode 3, the solution S reaches the solution circulation flow channel 34 in a state in which the concentration of the artificial synthetic resin in the solution S increased. In the case when the solution S was circulated by the solution circulation flow channel 34 without providing the cooling unit 341 and the reheating unit 342, for example, when the output of the electrochemical device 1 is reduced, the reaction amount of the artificial synthetic resin decreases at the anode 3. Therefore, the risk that the unused artificial synthetic resin adheres to the surface of the anode 3 becomes high. It is to be noted that, as examples of when the output of the electrochemical device 1 is reduced, the case when the power generation output is reduced in the fuel cell mode may be mentioned, and the case when the amount of hydrogen generated decreases in the hydrogen generation mode may be mentioned.

Figure 8:
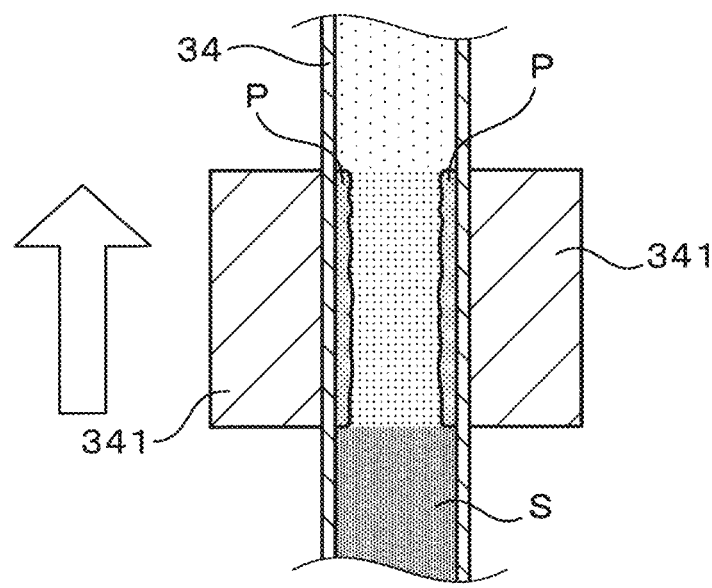
FIG. 8 is a diagram schematically illustrating a configuration around a cooling unit in the electrochemical device of the fifth embodiment.

With respect thereto, when the electrochemical device 1 has the aforementioned configuration, as exemplified in FIG. 8, first, the solution S containing the artificial synthetic resin which was not used at the anode 3 is cooled by the cooling unit 341. The cooling temperature of the cooling unit 341 can be appropriately set to a temperature at which the dissolved artificial synthetic resin deposits in accordance with the type of artificial synthetic resin. The artificial synthetic resin P which deposited by cooling adheres to the inner wall surface of the solution circulation flow channel 34 portion where the cooling unit 341 is provided. The concentration of the artificial synthetic resin in the circulating solution S can be reduced thereby. Next, the solution S for which the solution temperature decreased due to the cooling unit 341 is reheated by the reheating unit 342. The reheating temperature can be set to, for example, the operating temperature of the electrochemical device 1. More specifically, the reheating temperature can be set to, for example, 160° C. or more.

The aforementioned configuration makes it possible to circulate the solution S to control the concentration of the artificial synthetic resin, and can prevent the adhesion of the artificial synthetic resin to the anode 3 surface when the concentration of the artificial synthetic resin is high. It is to be noted that, since the artificial synthetic resin adhered to the inner wall surface at a portion of the solution circulation flow channel 34 where the cooling unit 341 is provided is periodically removed, the portion of the solution circulation flow channel 34 where the cooling unit 341 is provided can be configured to be replaceable. Other configurations, functions and effects are the same as those in the first embodiment.

Sixth Embodiment

The electrochemical device of the sixth embodiment will be described. The electrochemical device 1 of the present embodiment has the coating layer (not shown) for preventing the adhesion of the artificial synthetic resin to the inner wall surface of the supply passage of the solution S. This configuration can prevent the undissolved artificial synthetic resin present in the solution S from adhering to the inner wall surface of the supply passage of the solution S. Therefore, this configuration makes it possible to prevent clogging in the supply passage of the solution S, the reduction of the concentration of the artificial synthetic resin and the like, and is advantageous in improving the performance of the electrochemical device 1.

A ceramic layer and the like can be suitably used as the coating layer. When the coating layer is a ceramic layer, the ceramic layer may be comprised of a ceramic including an element such as aluminum (Al) and silicon (Si) from the viewpoint of reliably providing the effect for preventing the adhesion of the artificial synthetic resin. It is to be noted that, the supply passage of the solution S by which the coating layer is formed may be formed from at least one selected from the group including of, specifically, the above-mentioned solution supply flow channel 31, solution contact flow channel 32, the solution discharge flow channel 33, and, the solution circulation flow channel 34.

EXAMPLES

The examples will be described below.
—Preparation of Artificial Synthetic Resin—

A commercially available rope (made of vinylon), a sponge (polyurethane), a binding band (nylon 6,6), and a stocking (nylon/polyurethane) were prepared as the raw materials of the artificial synthetic resin. Further, a recycled PET (polyethylene terephthalate) bottle, and polyvinyl alcohol (PVA: manufactured by Wako Chemical Co., Ltd.) were prepared as the raw materials of the artificial synthetic resin. Each raw material was ground using a kitchen mixer (BM-R508 manufactured by Zojirushi Corporation) at three-minute intervals until the fragment size reached several mm in length. Each artificial synthetic resin was prepared thereby.

Figure 9A:
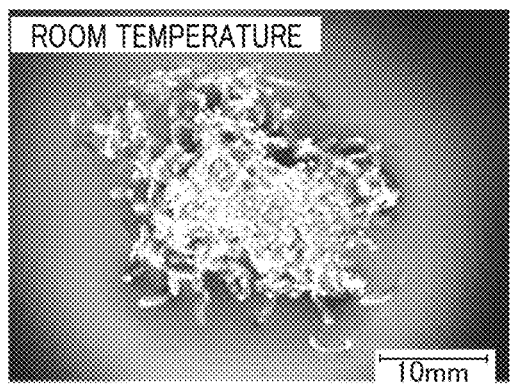
FIG. 9A are diagrams illustrating the shape change due to the heating temperature of the mixture of 85% $H_3PO_4$ and a sponge-derived polyurethane in the examples.
Figure 9B:
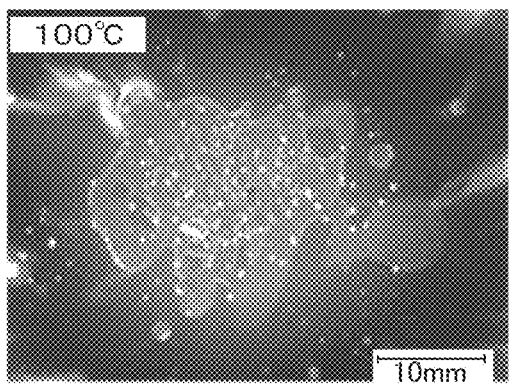
FIG. 9B are diagrams illustrating the shape change due to the heating temperature of the mixture of 85% $H_3PO_4$ and a sponge-derived polyurethane in the examples.
Figure 9C:
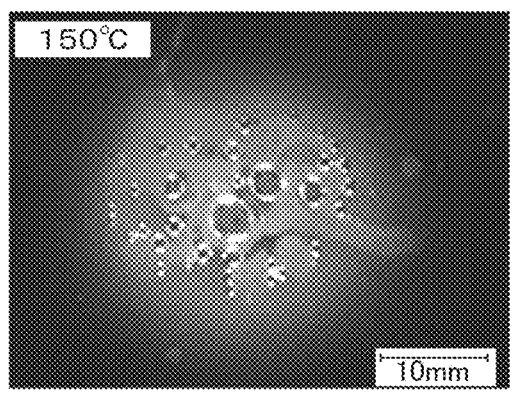
FIG. 9C are diagrams illustrating the shape change due to the heating temperature of the mixture of 85% $H_3PO_4$ and a sponge-derived polyurethane in the examples.
Figure 9D:
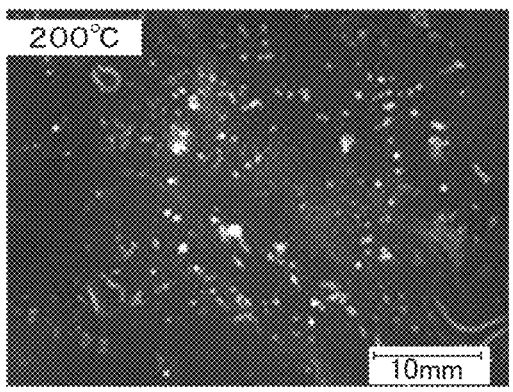
FIG. 9D are diagrams illustrating the shape change due to the heating temperature of the mixture of 85% $H_3PO_4$ and a sponge-derived polyurethane in the examples.

It is to be noted that an 85 weight % $H_3PO_4$ aqueous solution (manufactured by Wako Chemical, hereinafter, referred to as 85% $H_3PO_4$) was used and the solubility of each artificial synthetic resin was examined. As a typical example, the results when a sponge-derived polyurethane was used is illustrated in FIG. 9. Note that the sponge-derived polyurethane corresponds to polyurethane obtained from the sponge. FIG. 9A illustrates the results at room temperature, FIG. 9B illustrates the results when heated to 100° C., FIG. 9C illustrates the results when heated to 150° C., and FIG. 9D illustrates the results when heated to 200° C. According to the results, it is understood that the polyurethane is gradually liquefied by heating, and is completely liquefied at 200° C. The same acid solubility as in the rope-derived vinylon, the binding band-derived nylon 6,6, stocking-derived nylon/polyurethane, and the recycled PET bottle-derived polyethylene terephthalate and the polyvinyl alcohol was observed. Note that, the rope-derived vinylon corresponds to vinylon obtained from the rope. The binding band-derived nylon 6,6 corresponds to nylon 6,6 obtained from the binding band. The stocking-derived nylon/polyurethane correspond to nylon/polyurethane obtained from the stocking. The recycled PET bottle-derived polyethylene terephthalate corresponds to polyethylene terephthalate obtained from the recycled PET bottle. From these results, it is possible to promote the electrolytic reaction of the artificial synthetic resin by exposing the solution to a temperature of 180° C. or more prior to being supplied to the anode.

—Preparation of Electrolyte Film—

The electrolyte film was manufactured by the following method. Specifically, 1.0 g of $Sn_{0.9}In_{0.1}P_2O_7$ powder was mixed with 0.04 g of PTFE powder, and the obtained mixture was cold rolled into a film-shape having a thickness of 200 μm using a rolling mill. Next, the obtained film was cut into a disc-shape having a predetermined diameter according to the cell size which will be described later. The electrolyte film was prepared thereby.

—Preparation of the Anode and the Cathode—

The anode and the cathode were prepared by the following method. Ketjen Black EC-600JDK (hereinafter, referred to as, Ketjen), activated carbon (MAXSORB (registered trademark), BEAPS (registered trademark)), and, mesoporous carbon (MH, MJ010, MJ030, MJ150) were prepared as the carbon. These carbons were obtained from Akzo Nobel N.V., Kansai Coke and Chemicals Co., Ltd., Asahi Yukizai Corporation, and Toyo Tanso Co., Ltd. 1.00 g of carbon powder was suspended in 150 mL of deionized water, and subjected to an ultrasonic treatment for 30 minutes. A solution of $H_2PtCl_6 \cdot 6H_2O$ and $NaBH_4$ (by molar ratio 1:5) was dripped into the suspension while stirring. Next, the mixture was filtered, and the filtrate was washed in deionized water until the pH of the filtrate became 7. Next, after vacuum drying overnight at 90° C., a catalyst was treated with a 10% by volume hydrogen-Ar mixture at 200° C. for one hour. 0.01 g of the obtained electrode powder was mixed with 85% $H_3PO_4$ by a mixer, and dispersed. Next, the obtained slurry was applied on the surface of a carbon cloth. In this case, the supported amount of Pt in the platinum-on-carbon (hereinafter, there are cases when the platinum-on-carbon is referred to as Pt/C) was adjusted to approximately 1.7 mg/cm$^2$ by controlling the weight and the thickness of the electrode. Pt/C(Ketjen), Pt/C(MAXSORB), Pt/C (BEAPS), Pt/C(MH), Pt/C(MJ010), Pt/C(MJ030), and Pt/C (MJ150) were prepared as the anode thereby. Further, Pt/C (ElectroChem, Inc., carbon carrier: Vulcan XC72, carbon paper: Toray Industries Inc., TGP-H-090, supported amount of Pt: 2 mg/cm$^2$) was prepared separately as the anode. This carbon is denoted as Pt/C(Vulcan). It is to be noted that each anode was impregnated with 85% $H_3PO_4$ at 120° C. prior to use. Pt/C(Vulcan) was prepared as the cathode as stated above. It is to be noted that, in the present example, Pt/C(Vulcan) is used in the cathode, but each PT/C used in the aforementioned anode can be used for the cathode.

<Manufacture of Electrochemical Cell and Electrochemical Measurement>

Figure 10:
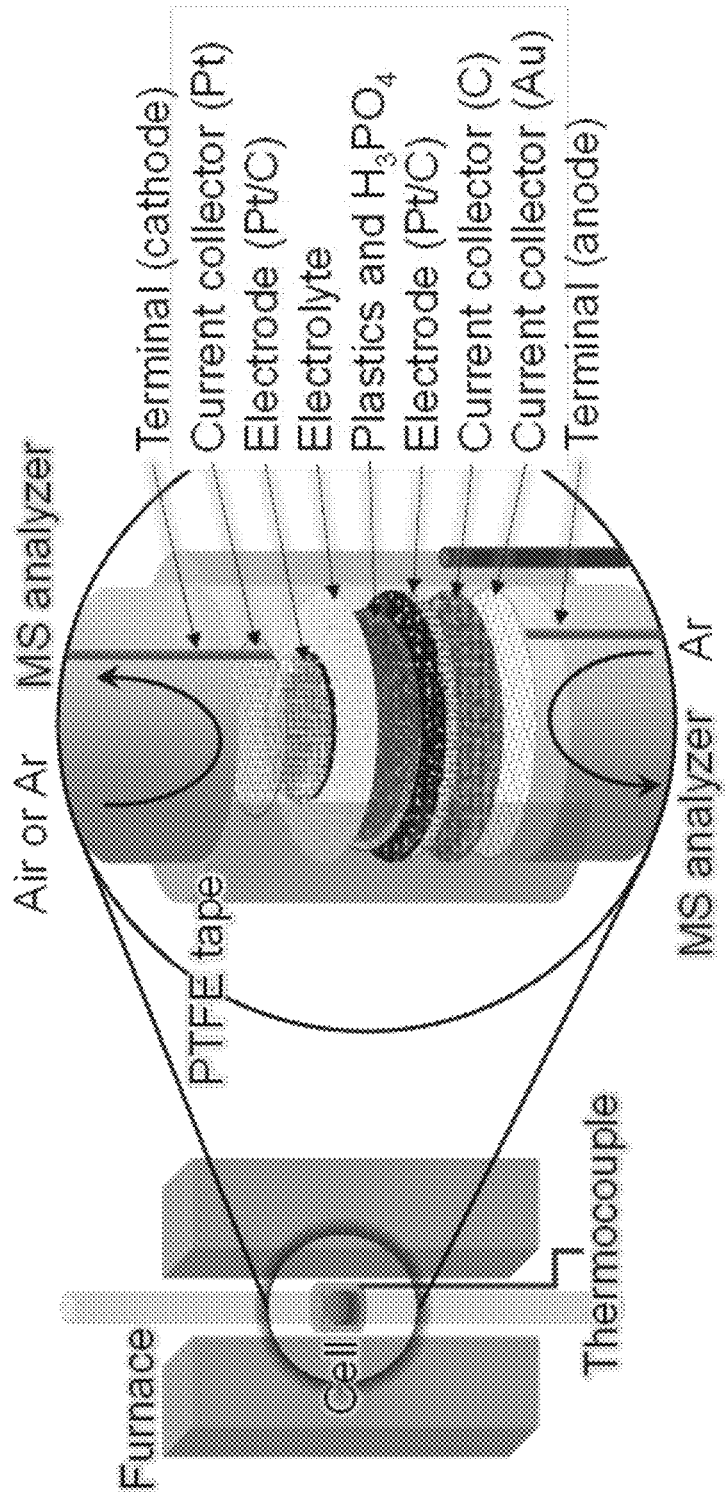
FIG. 10 is an explanatory view schematically illustrating a two-compartment cell in the examples.
Figure 11:
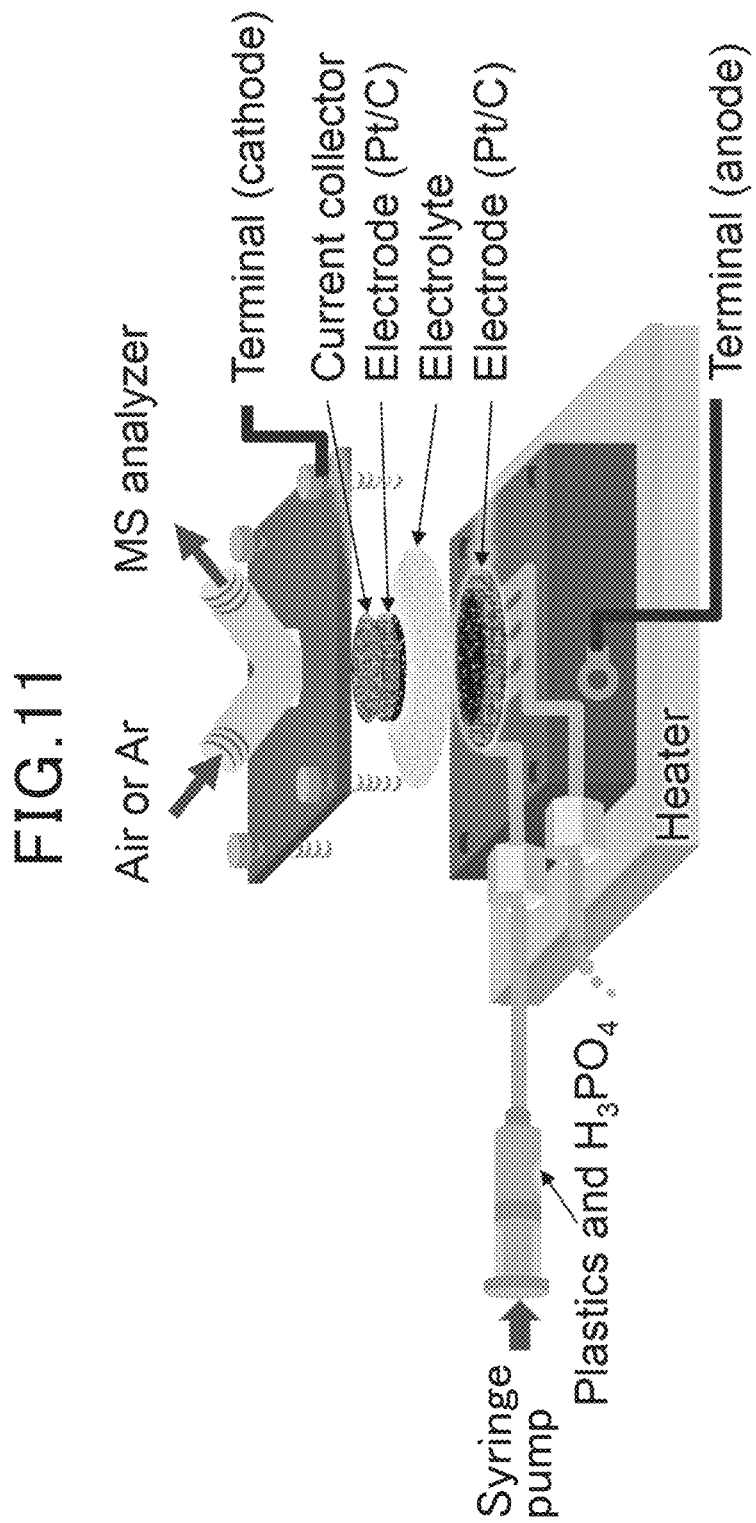
FIG. 11 is an explanatory view schematically illustrating a flow cell in the examples.

Two types of electrochemical cells, a two-compartment cell and a flow cell, were prepared. The diameters of the electrolyte film and the anode were adjusted in accordance with the cell size (The electrolyte film had a diameter of 13 mm in the case of the two-compartment cell and had a diameter of 31 mm in the case of flow cell. The anode had a diameter of 12 mm in the case of the two-compartment cell and had a diameter of 15 mm in the case of the flow cell). A cathode having a diameter of 8 mm and am area of 0.5 cm$^2$ was used in both of the types of cells. A membrane electrode assembly in which the anode was joined on one side (first major surface) of the electrolyte film and the cathode was joined on the other side (second major surface) was configured to obtain the electrochemical cell. The two-compartment cell was covered in this area with PTFE tape, and the flow cell was hermetically sealed using an elastomer O-ring. A schematic explanatory view of the two-compartment cell is illustrated in FIG. 10. A schematic explanatory view of the flow cell is illustrated in FIG. 11.

For the two-compartment cell, a gelatinized mixture of a predetermined artificial synthetic resin (85 mg) and 85% $H_3PO_4$ approximately 225 mg) was deposited on the anode surface beforehand. It is to be noted that, since the two-compartment cell is not configured so that a solution containing water, an artificial synthetic resin, and an acid is continuously supplied to the anode, the aforementioned gelatinized mixture is provided to the anode. For the flow cell, a solution (concentration of artificial synthetic resin: 1.42 weight %) of the predetermined artificial synthetic resin and 85% $H_3PO_4$ was supplied to the anode at an infusion rate of 0.13 mL/min using a syringe pump. It is to be noted that, in the two-compartment cell, air or Ar is supplied to the anode and air is supplied to the cathode at a flow rate of 50 mL/min. In the flow cell, air or Ar was supplied to the cathode by the same method as in the case of the two-compartment cell. An online mass spectrometer (Pfeiffer Vacuum ThermoStar (registered trademark)) was used in the analysis of each outlet gas. Further, all of the measurements were performed using a potentiostat-galvanostat (Solartron 1287) and a frequency response analyzer (Solartron 1260). In the two-compartment cell, an I-V curve was recorded at scanning speeds of 2.5, 5.0, and, 10.0 mV/s, and in the flow cell, the I-V curve was recorded at a scanning speed of 2.5 mV/s. A voltage-time curve was obtained at a current density of 10 mA/cm$^3$ for the flow cell. A current-time curve was measured at a cell voltage of 0.55 V in the flow cell. An impedance spectrum was obtained for a frequency range of 0.1-10$^6$ Hz, an open circuit cell voltage for a fuel cell, and a bypass voltage of 0.4 V for a hydrogen generator.

Example 1

A gelatinized paste was produced by mixing a sponge-derived polyurethane with 85% $H_3PO_4$ at room temperature. This paste was deposited on a surface of Pt/C(Vulcan) and adhered to one surface of the electrolyte film comprised from $Sn_{0.9}In_{0.1}P_2O_7$ and PTFE to obtain the anode. On the other hand, the same Pt/C(Vulcan) as stated above was laminated on the other surface of the electrolyte film to obtain the cathode. The obtained membrane electrode assembly was set in the two-compartment cell, Ar was supplied to the anode and air or Ar was supplied to the cathode. When the temperature was raised from room temperature to 200° C., in addition to Ar, water vapor and a negligible amount of carbon dioxide were detected in the gas output from the anode.

Figure 12:
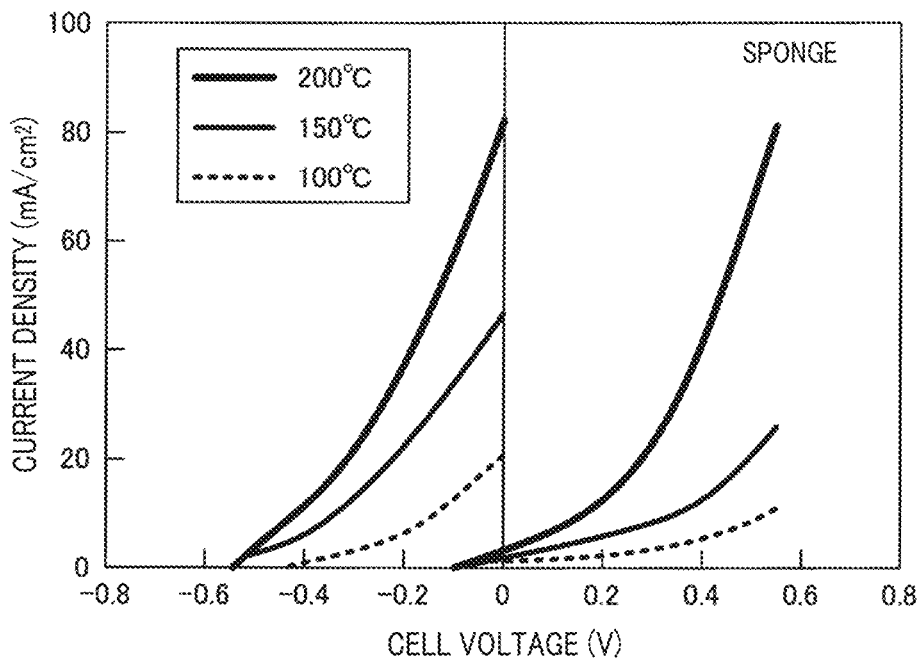
FIG. 12 is a diagram illustrating the relationship between the cell voltage and the current density of the electrochemical cell which uses the sponge-derived polyurethane as the artificial synthetic resin in Example 1.

The relationship between the cell voltage and the current density of the electrochemical cell in the present example is illustrated in FIG. 12. When air was supplied to the cathode, the electrochemical cell produced a substantially negative anode potential in the cathode under open circuit conditions, and exhibited current-voltage (IV) characteristics similar to a fuel cell when defined as the following cell voltage. This is supported by the fact that a propeller mounted on the motor shaft was rotated by connecting the motor to the electrochemical cell heated to 163° C.

Figure 13:
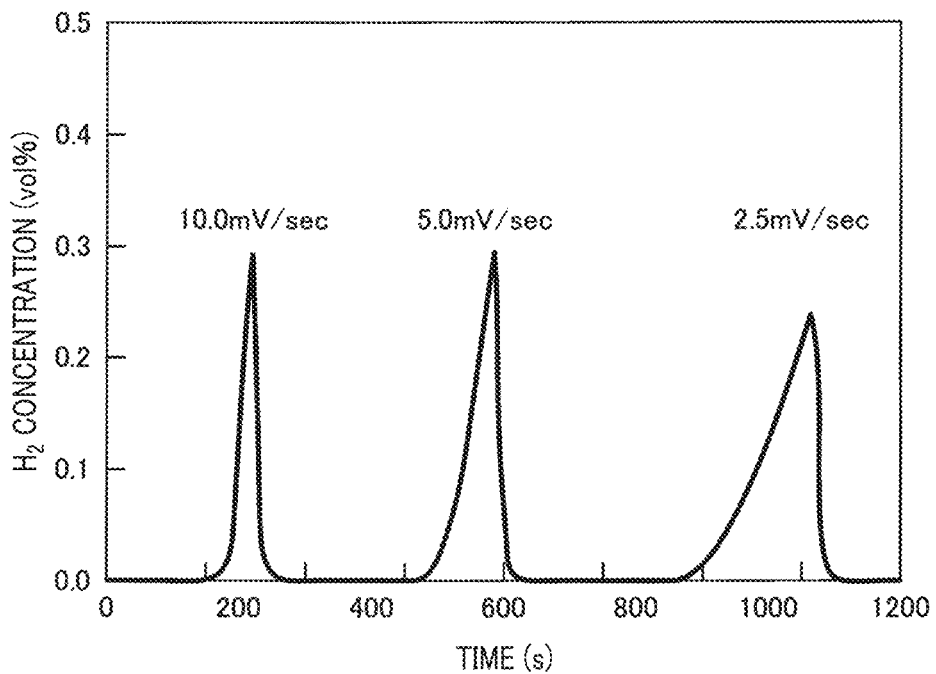
FIG. 13 is a diagram illustrating the generation of hydrogen when Ar was supplied to the cathode of the electrochemical cell which uses the sponge-derived polyurethane as the artificial synthetic resin in Example 1.
Figure 14:
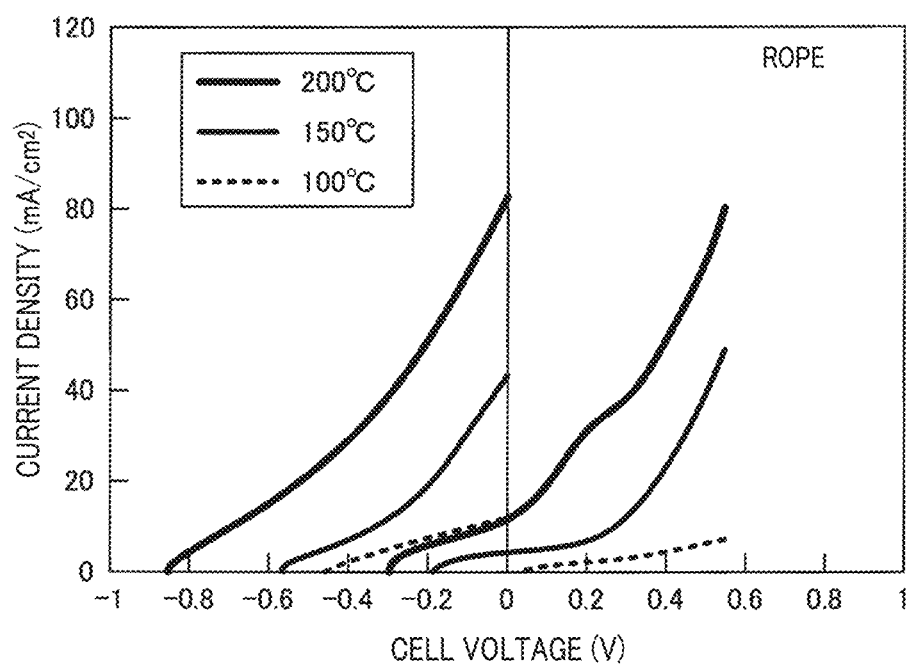
FIG. 14 is a diagram illustrating the relationship between the cell voltage and the current density of the electrochemical cell which uses a rope-derived vinylon as the artificial synthetic resin in Example 1.
Figure 15:
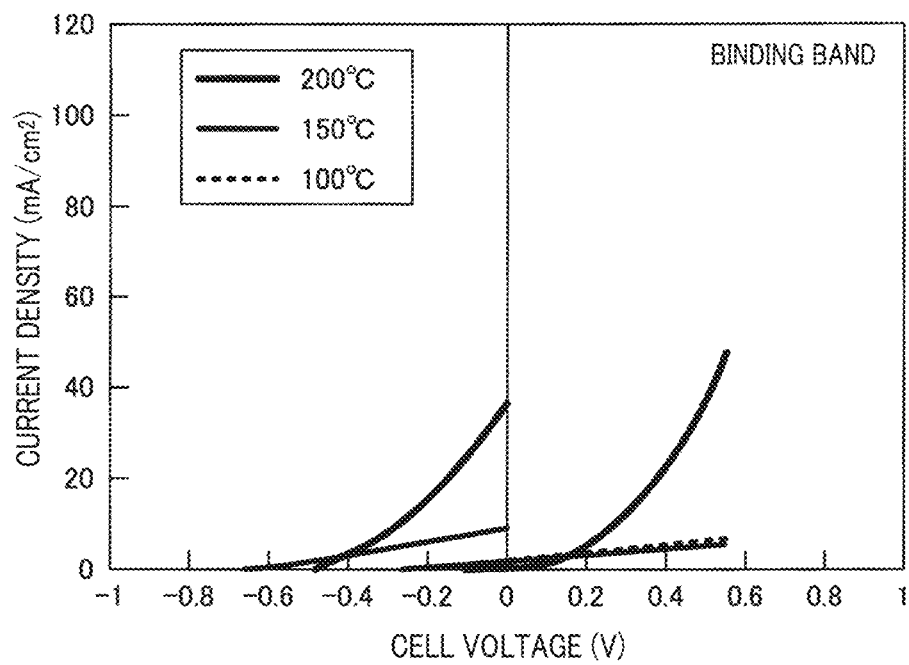
FIG. 15 is a diagram illustrating the relationship between the cell voltage and the current density of the electrochemical cell which uses a binding band-derived nylon 6,6 as the artificial synthetic resin in Example 1.
Figure 16:
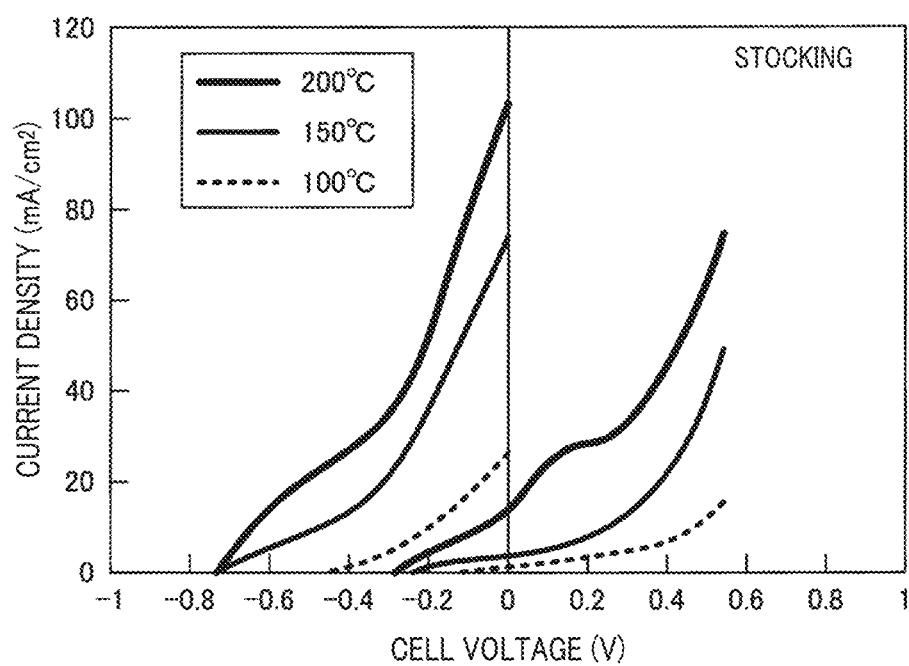
FIG. 16 is a diagram illustrating the relationship between the cell voltage and the current density of the electrochemical cell which uses a stocking-derived nylon/polyurethane as the artificial synthetic resin in Example 1.
Figure 17:
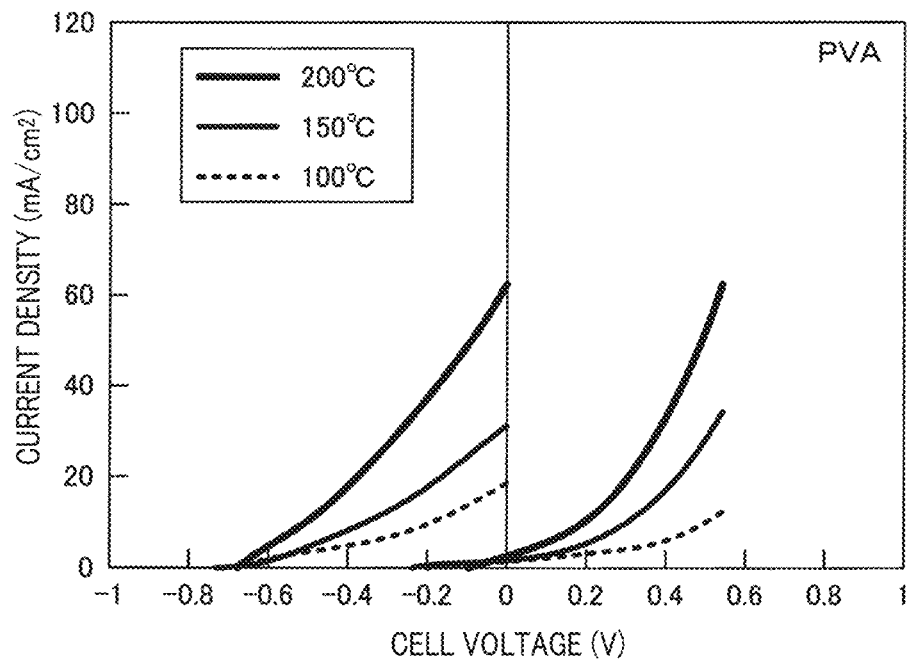
FIG. 17 is a diagram illustrating the relationship between the cell voltage and the current density of the electrochemical cell which uses PVA as the artificial synthetic resin in Example 1.

On the one hand, as illustrated in FIG. 12, an open circuit cell voltage decreased considerably by supplying Ar in place of air to the cathode. Specifically, the I-V gradient at 200° C. was remarkably similar to that observed for the fuel cell described above. This suggests that the same anode reaction occurred in two processes. As illustrated in FIG. 13, the generation of hydrogen from the cathode was confirmed among the I-V measurements at 200° C. from 2.5 to 5.0 and 10.0 mV/sec. From this result, it was demonstrated that the electrochemical cell can generate hydrogen by the electrolysis of polyurethane. As illustrated in FIG. 14 to FIG. 17, the same results as above could be obtained even when using the rope-derived vinylon, the binding band-derived nylon 6,6, the stocking-derived nylon/polyurethane and PVA as the artificial synthetic resin. From these results, it was verified that the electrochemical cell of the present example can effectively use an artificial synthetic resin as a fuel for a fuel cell or a hydrogen generator.

Example 2

The power generation characteristics when using a flow cell type electrochemical cell and operating continuously in the fuel cell mode were examined Specifically, the configuration of the electrochemical cell is as follows.

anode: Pt/C(MJ010)

electrolyte film: mixture of $Sn^{0.9}In_{0.1}P_2O_7$ and PTFE, film thickness: 200 μm cathode: Pt/C(Vulcan)

The artificial synthetic resins which were used were the sponge-derived polyurethane, the rope-derived vinylon, the binding band-derived nylon 6,6, the stocking-derived nylon/polyurethane and PET. It is to be noted that, the acid solution which was used was the above-mentioned 85% $H_3PO_4$.

Figure 18:
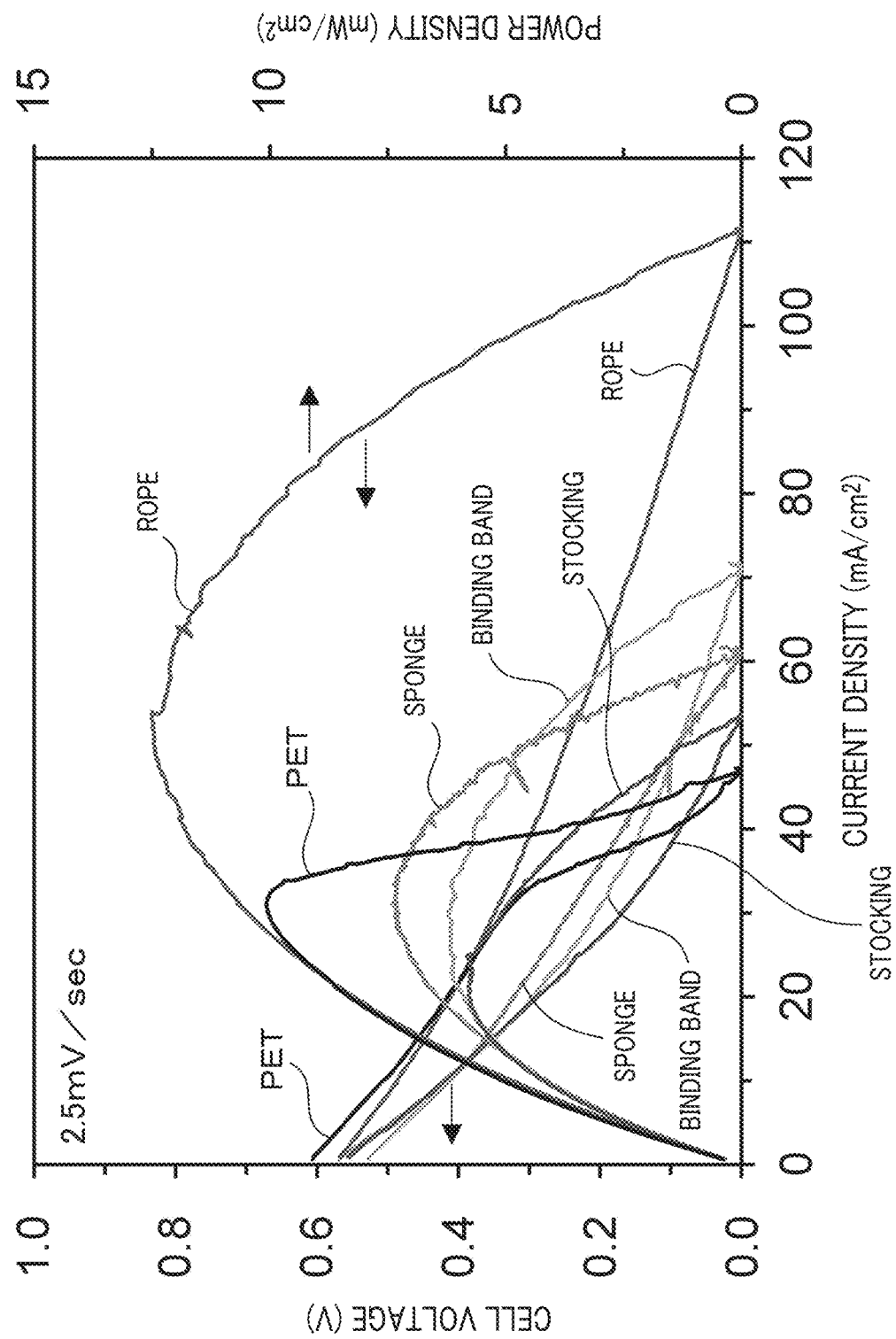
FIG. 18 is a diagram illustrating the power generation characteristics when continuously operating in a fuel cell mode by using a flow cell type electrochemical cell and changing the type of artificial synthetic resin in Example 2.

FIG. 18 illustrates the results. It is to be noted that, FIG. 18 illustrates the power generation characteristics when the applied voltage speed was 2.5 mV/sec. As illustrated in FIG. 18, even though the electrochemical cell of the present example has a different peak power density, it was verified that power generation was possible using any of the artificial synthetic resins. Further, with reference to the results of Example 1, it is understood that it is possible to generate hydrogen on the cathode side using any of the artificial synthetic resins by supplying an inert gas such as Ar to the cathode and applying a voltage between the anode and the cathode.

Example 3

An electrochemical cell was used in the same manner as Example 2, and a solution containing water, polyvinyl alcohol, phosphoric acid and sulfuric acid was supplied to the anode to examine the effect which the mass ratio between the phosphoric acid and the sulfuric acid exerts on the cell resistance. Specifically, a concentrated sulfuric acid was added to an acidic solution comprising polyvinyl alcohol and 85% $H_3PO_4$, and this solution was supplied to the anode. The results are illustrated in FIG. 19.

Figure 19:
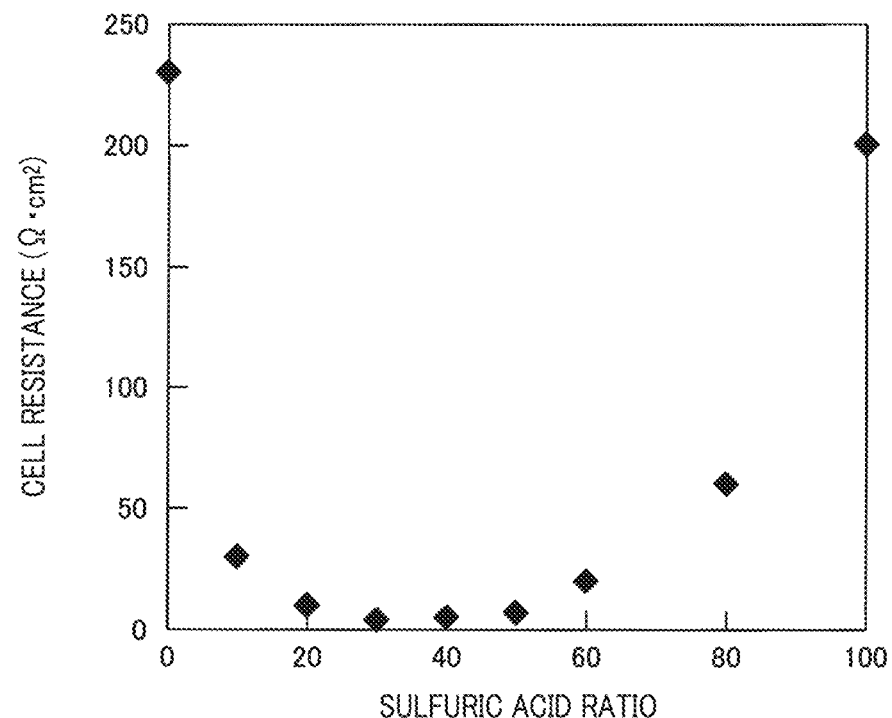
FIG. 19 is a diagram illustrating the influence that the mass ratio between the phosphoric acid and the sulfuric acid in the solution which is supplied to the anode exerts on the cell resistance in Example 3.

As illustrated in FIG. 19, by adding sulfuric acid to the solution which is supplied to the anode, the cell resistance can decrease. It is thought that this occurs because the solubility of the artificial synthetic resin improves by adding sulfuric acid which is a strong acid even for an artificial synthetic resin which is difficult to dissolve with only phosphoric acid, and the electrolytic reaction of the artificial synthetic resin in the anode is promoted. According to this result, when the electrochemical cell is used in the fuel cell mode, it is possible to improve the power generation performance by decreasing the cell resistance, and when the electrochemical cell is used in the hydrogen generation mode, it is possible to increase the amount of hydrogen generation by decreasing the cell resistance. However, as illustrated in FIG. 19, if the sulfuric acid ratio in the acid contained in the solution increases excessively, in contrast, the cell resistance increases, and the beneficial effect of the addition of sulfuric acid decreases. From this result, it is understood that when the mass ratio of phosphoric acid to sulfuric acid in the solution is in a range from 90:10 to 20:80, the cell resistance decreases easily.

Example 4

An electrochemical cell was used in the same manner as Example 2, and the entire cell was heated and operated at 200° C. The artificial synthetic resin was the binding band-derived nylon 6,6. In this case, when the edge of the supply side of the solution in the anode is the origin 0, and the edge of the discharge side of the solution in the anode is X, the solution was heated by the heater so that the temperature of the solution in the solution contact flow channel of the supply side of the solution with respect to the center part which is X/2 did not decrease below 160° C. It is to be noted that, the heater was arranged on the flow channel side surface of the solution contact flow channel. Further, the electrochemical cell was operated without being heated by the heater. The results are illustrated in FIG. 20.

Figure 20:
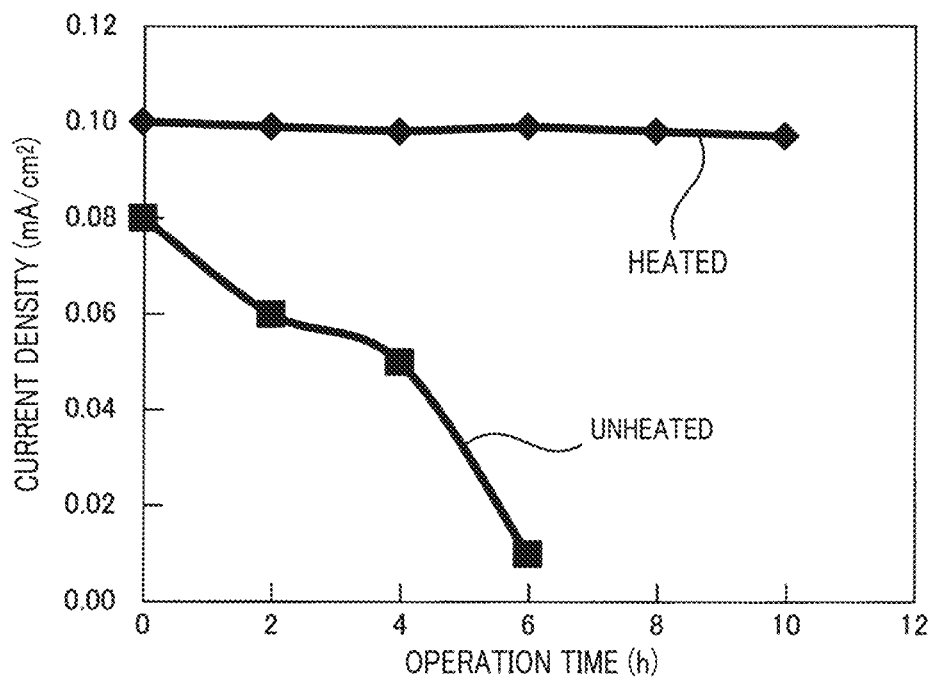
FIG. 20 is a diagram illustrating the relationship between the operation time and the current density depending on the presence of a heated solution in the upstream solution contact flow channel from the origin 0 to the center part X/2 in Example 4.

As illustrated in FIG. 20, when the solution in the upstream solution contact flow channel from the origin 0 to the center part X/2 was not heated, the current density decreased due to power generation as the operation time increased. With respect thereto, when the solution in the upstream solution contact flow channel from the origin 0 to the center part X/2 was heated, the reduction of the current density was not observed even though the operation time increased, thus, it was possible to perform stable power generation. These results are obtained because the artificial synthetic resin can be continuously and directly electrolyzed by locally controlling the temperature of the upstream solution contact flow channel where the influence of the temperature reduction of the solution due to the endothermic reaction of the artificial synthetic resin is large to 160° C. or more.

Example 5

The dissolved artificial synthetic resin is still in a polymeric form, and thus, the comparative flowability is poor and the diffusibility in the anode is low. When carbon particles are used in the anode, it is considered that the spatial structure of the carbon particles are important in the reaction of an artificial synthetic resin. Therefore, the pore volume distribution was measured for each type of carbon prepared as stated above. The measurement method of the pore volume distribution is as described above. The differential pore volume distribution of each type of carbon prepared in the examples is illustrated in FIG. 21.

Figure 21:
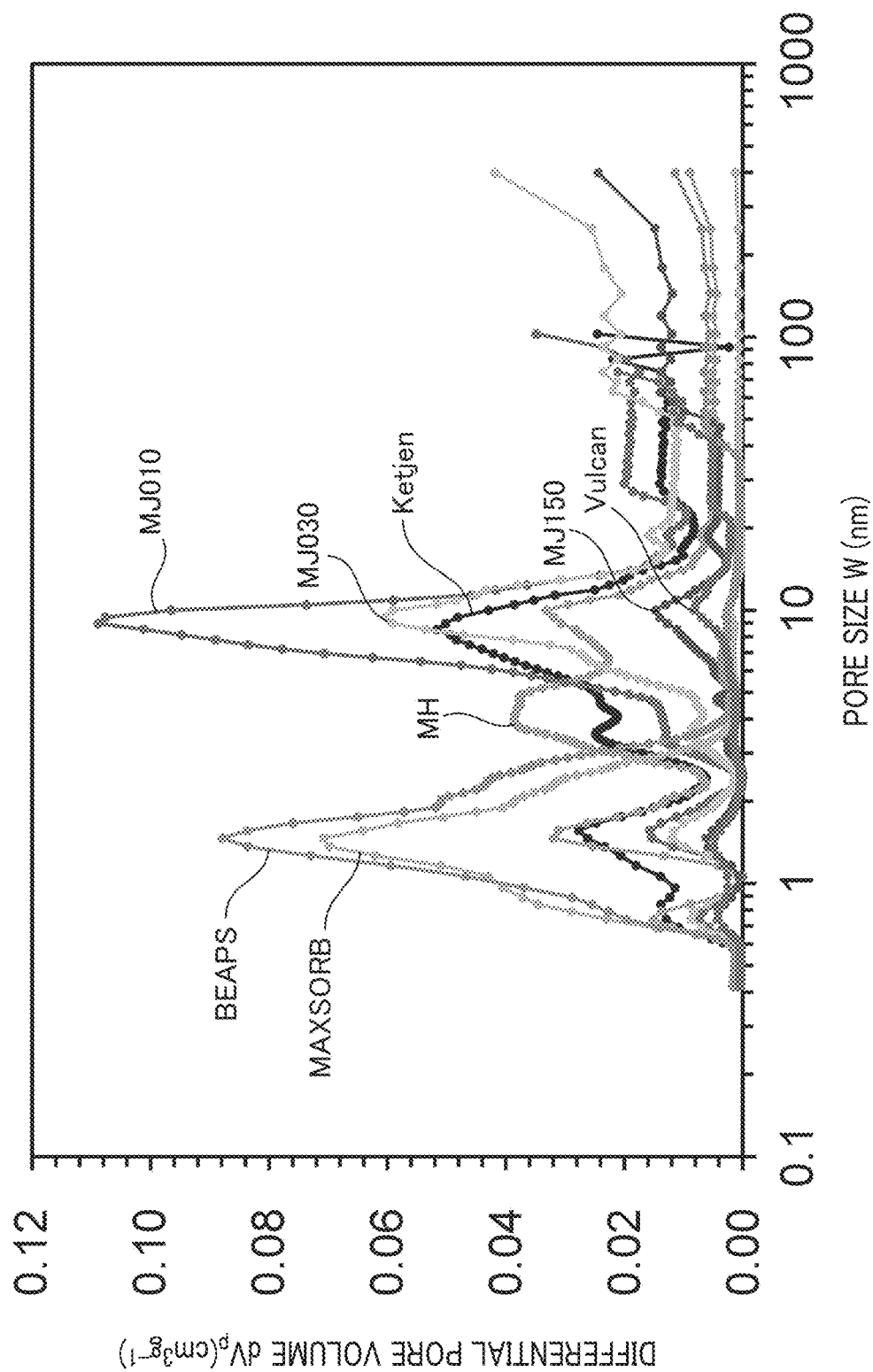
FIG. 21 is a diagram illustrating the pore volume distribution for the numerous carbon materials measured in Example 5.

As illustrated in FIG. 21, the carbon materials Vulcan and MJ150 were not observed to have remarkable pore volume distributions. With respect to these, it was verified that the carbon materials other than Vulcan and MJ150 have characteristic (remarkable) pore volume distributions which are different than the carbon materials Vulcan and MJ150. Specifically, the carbon materials Ketjen, MH, MJ010, and MJ030 have pore volume distributions having a peak pore size in the range of a pore size not less than 2 nm and not more than 200 nm, thus, the peak pore size was large compared to the carbon materials MAXSORB and BEAPS. It is to be noted that, the carbon materials Ketjen, MH, MJ010, and MJ030 have differential pore volumes in the peak pore size of 0.02 ($cm^3$/g) or more.

Figure 22:
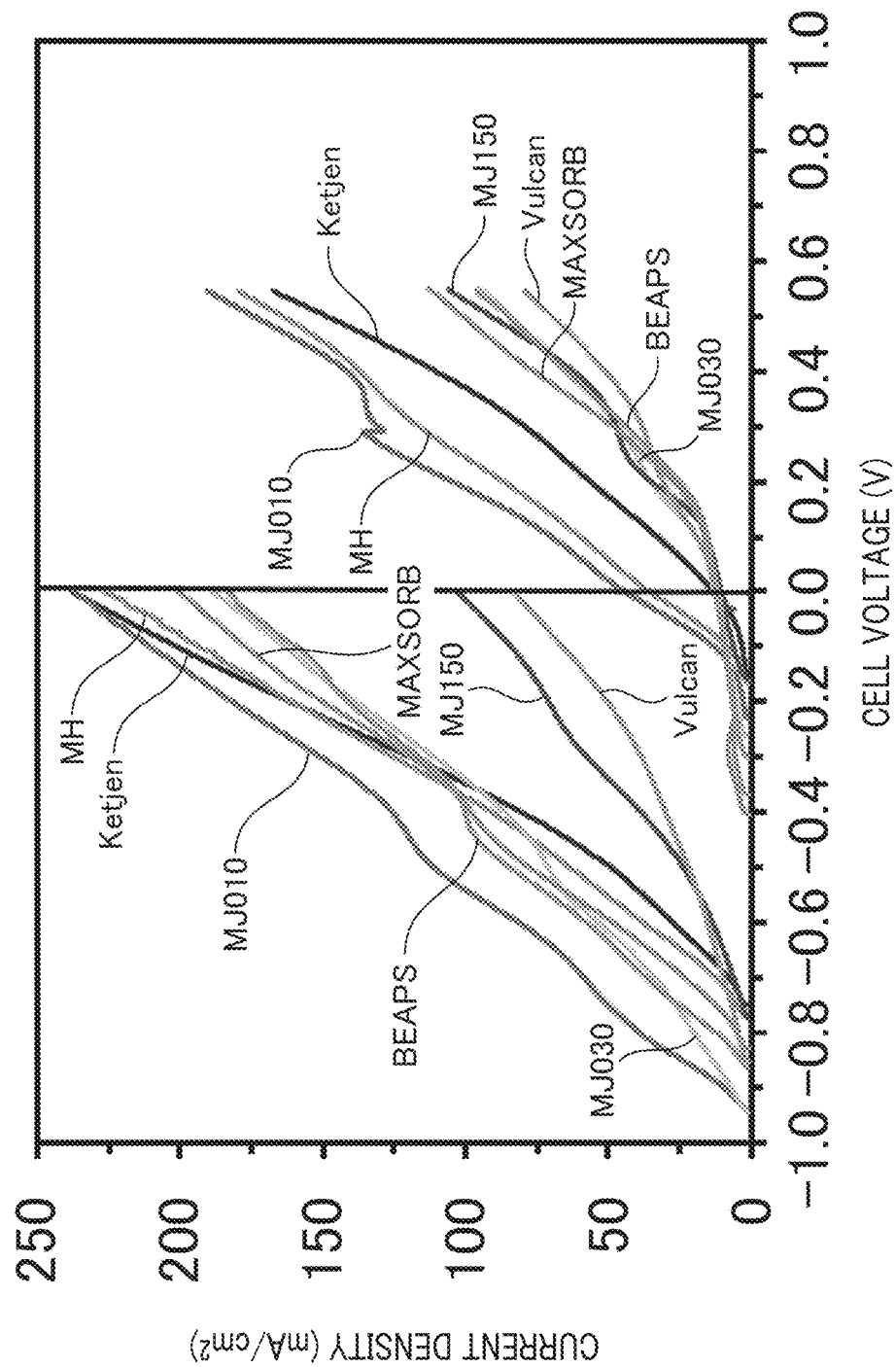
FIG. 22 is a diagram illustrating the relationship between the cell voltage and the current density of each electrochemical cell having anodes of different carbon types using the rope-derived vinylon as the artificial synthetic resin in Example 5.

Next, an electrochemical cell having an anode of a different carbon type was prepared in the same manner as Example 1. The carbon types of the anode are Ketjen, MH, MJ010, MJ030, MJ150, MAXSORB, BEAPS, or, Vulcan which are illustrated in the above-mentioned FIG. 21. The electrochemical cell was operated under the conditions of an operation temperature of 200° C. and the artificial synthetic resin used in the anode was a rope-derived vinylon, and the relationship between the cell voltage and the current density was measured. The results are illustrated in FIG. 22. As illustrated in FIG. 22, the higher the peak pore size of the carbon, the higher the current density.

From these results, it is possible to improve the performance of the electrochemical cell using carbon particles having a peak pore size in the range of a pore size not less than 2 nm and not more than 200 nm in the anode. It is thought that this makes it possible to reduce the electrode resistance because the flowability and the diffusibility of the artificial synthetic resin within the anode improves. If the peak pore size is in the range of not less than 3 nm and not more than 20 nm, the aforementioned result can be reliably produced.

Next, the carbon materials MJ030 and Vulcan were subjected to an oxidation-reduction treatment and provided with CO groups. Specifically, the oxidation treatment was performed by adding 1.0 g of a predetermined carbon to an aqueous solution obtained by mixing 20 mL of 24% nitric acid with 30 mL of water, and stirring on a hot plate at room temperature, at 300 rpm for 72 hours. Further, the reduction treatment was performed by heat treating the carbon at 600° C. after the oxidation treatment under a hydrogen atmosphere.

Next, Vulcan and MJ030 which were not provided with CO groups and Vulcan and MJ030 which were provided with CO groups were used to prepare an electrochemical cell in the same manner as in Example 2. In short, the carbon type of the anode in the prepared electrochemical cell were Vulcan which was not provided with CO groups, MJ030 which was not provided with CO groups, Vulcan (hereinafter, referred to as Vulcan+CO) which was provided with CO groups, or, MJ030 (hereinafter, referred to as MJ030+CO) which was provided with CO groups. It is to be noted that Pt was supported on each carbon in the same manner as Example 2. Moreover, the electrochemical cell was operated under the conditions of an operation temperature of 200° C. and the artificial synthetic resin used in the anode was rope-derived vinylon, and the power density and the open circuit voltage were measured. The results are illustrated in FIG. 23.

Figure 23:
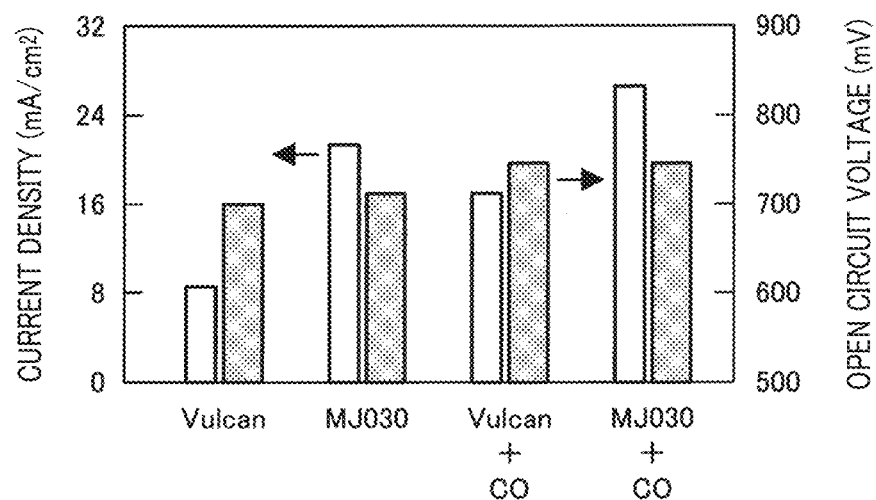
FIG. 23 is a diagram for comparing the characteristics of the electrochemical cell due to the differences of the carbon type used in the anode in Example 5.

As illustrated in FIG. 23, it is understood that the power density and the open circuit voltage are increased by using a carbon in which the peak pore size is large. Further, it is understood that the power density and the open circuit voltage are increased by providing CO groups on the carbon surface. From these results, by being configured so that the anode contains carbon particles having a carbonyl group, and the pore volume distribution of the carbon particles has a peak pore size in the range of a pore size not less than 2 nm and not more than 200 nm, it is possible to reduce the electrode resistance, and thus, the performance of the electrochemical cell can be improved.

Example 6

A flow cell type electrochemical cell was prepared in the same manner as Example 2, the solution was stirred prior to supplying the solution to the anode, and the stirred solution was supplied to the anode. The stirring mechanism was any of ultrasonic stirring and stirring with a mixer. The ultrasonic wave during ultrasonic stirring was set to 20 kHz. The mixer stirring speed was set to 300 rpm. Further, for comparison, a solution which was not provided with a stirring mechanism and was not stirred was supplied to the anode. The output density of the electrochemical cell was measured for these cases. It is to be noted that, the artificial synthetic resin which was used was a binding band-derived nylon 6,6. The results are illustrated in FIG. 24.

Figure 24:
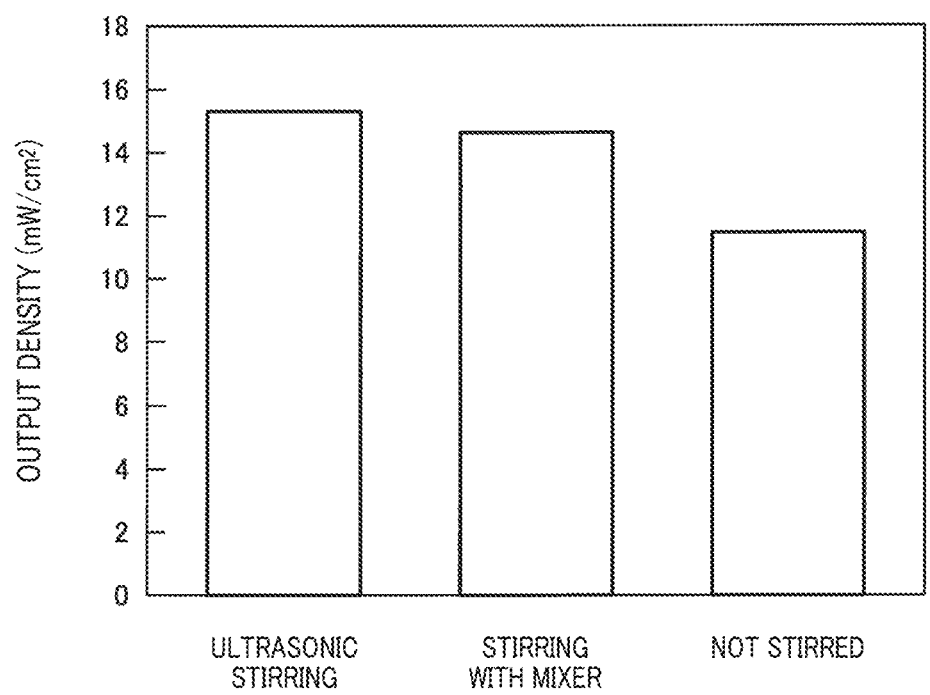
FIG. 24 is a diagram illustrating the relationship between the presence of a stirring mechanism which stirs the solution which is supplied to the anode and the output density in Example 6.

As illustrated in FIG. 24, when there is a stirring mechanism for the solution prior to supplying the solution to the anode, the output density of the electrochemical cell improved compared to when there was no stirring mechanism. It is thought that due to the stirring of the solution by the stirring mechanism, the dispersibility of the undissolved artificial synthetic resin which may be included in the solution improves, the aggregation of solid artificial synthetic resin to the anode surface and the deterioration of the anode due to the adhesion can be prevented, and it also becomes easy to supply the solid artificial synthetic resin to the reaction field of the anode as a fuel.

Example 7

Figure 25A:
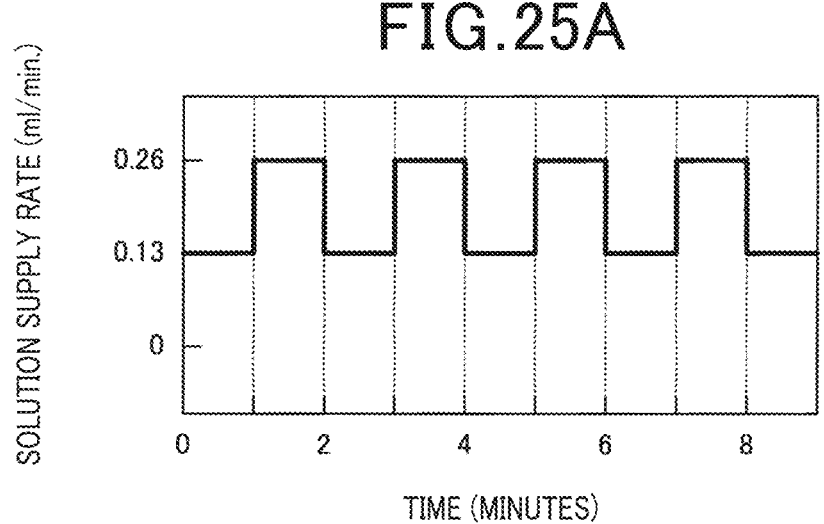
FIG. 25A is a diagram for describing the change of the solution supply rate and the solution supply pressure in Example 7.
Figure 25B:
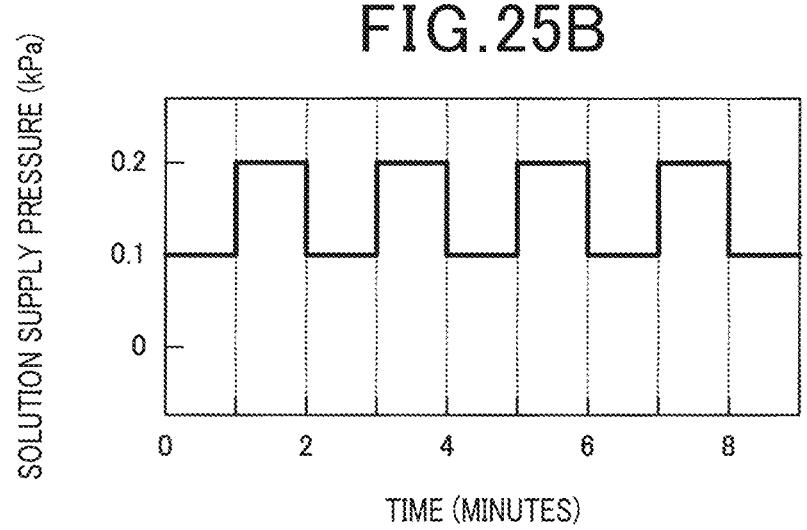
FIG. 25B is a diagram for describing the change of the solution supply rate and the solution supply pressure in Example 7.

A flow cell type electrochemical cell was used in the same manner as Example 2, the solution supply rate was changed by the syringe pump to a pulse form as illustrated in FIG. 25A, and the output density was measured. Further, the solution supply pressure was changed by the syringe pump to a pulse form as illustrated in FIG. 25B, and the output density was measured. Further, for comparison, the solution supply rate and the solution supply pressure were not changed by the syringe pump, both of the solution supply rate and the solution supply pressure were made constant, and the output density was measured. It is to be noted that the artificial synthetic resin which was used was a polyvinyl alcohol. The results are illustrated in FIG. 26.

Figure 26:
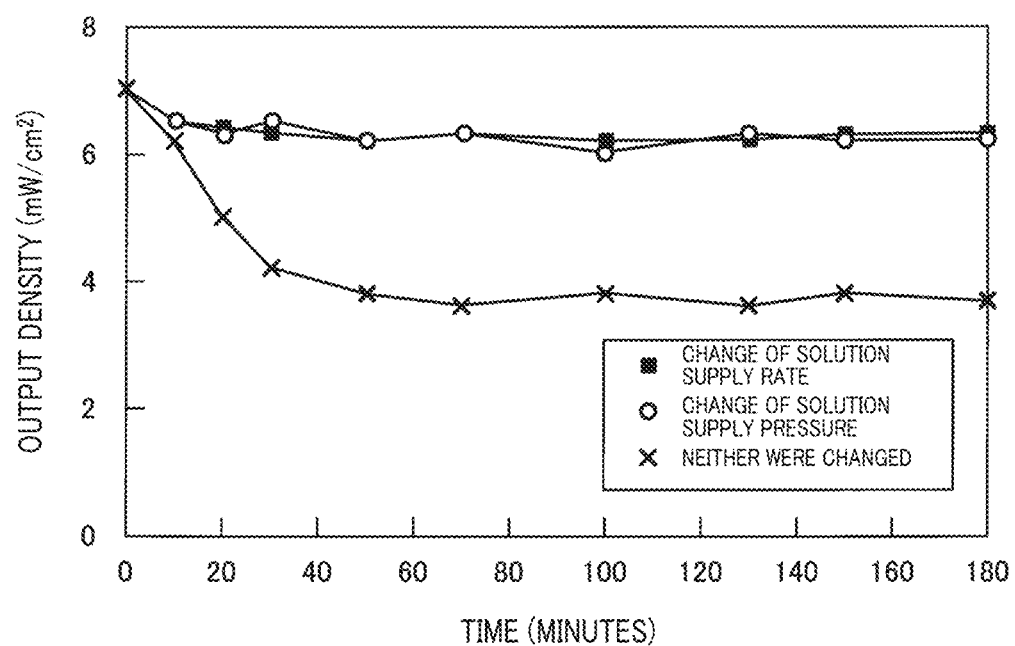
FIG. 26 is a diagram illustrating the relationship between the presence of a change of the solution supply rate or the solution supply pressure and the output density in Example 7.

As illustrated in FIG. 26, when the solution supply rate or the solution supply pressure was changed, the output density of the electrochemical cell improved compared to when the solution supply rate and the solution supply pressure were not changed. This may make it possible to promote the desorption of the gas adsorbed on the anode surface by changing the solution supply rate or the solution supply pressure, and does not limit the supply of the artificial synthetic resin to the anode, thus, it was possible to prevent output reduction of the electrochemical cell.

Example 8

A flow cell type electrochemical cell was prepared in the same manner as Example 2, and connected with a solution circulation flow channel between the solution supply flow channel and the solution discharge flow channel. Moreover, a cooling unit was provided in the solution circulation flow channel, and a reheating unit was provided in the downstream side of the cooling unit. The cooling unit is configured by a water-cooling device mounted on a side wall surface of the solution circulation flow channel. The reheating unit is configured by a heater mounted on a side wall surface of the solution circulation flow channel. The cooling temperature of the solution by the cooling unit was set to 5° C. The reheating temperature of the solution by the reheating unit was set as the operation temperature of the electrochemical cell. The resistance increase ratios were measured in the case when the operation temperature of the electrochemical cell was varied and the circulating solution was cooled and reheated, and the case when the circulating solution was not cooled and reheated. It is to be noted that, the artificial synthetic resin which was used was a polyvinyl alcohol. The results are illustrated in FIG. 27.

Figure 27:
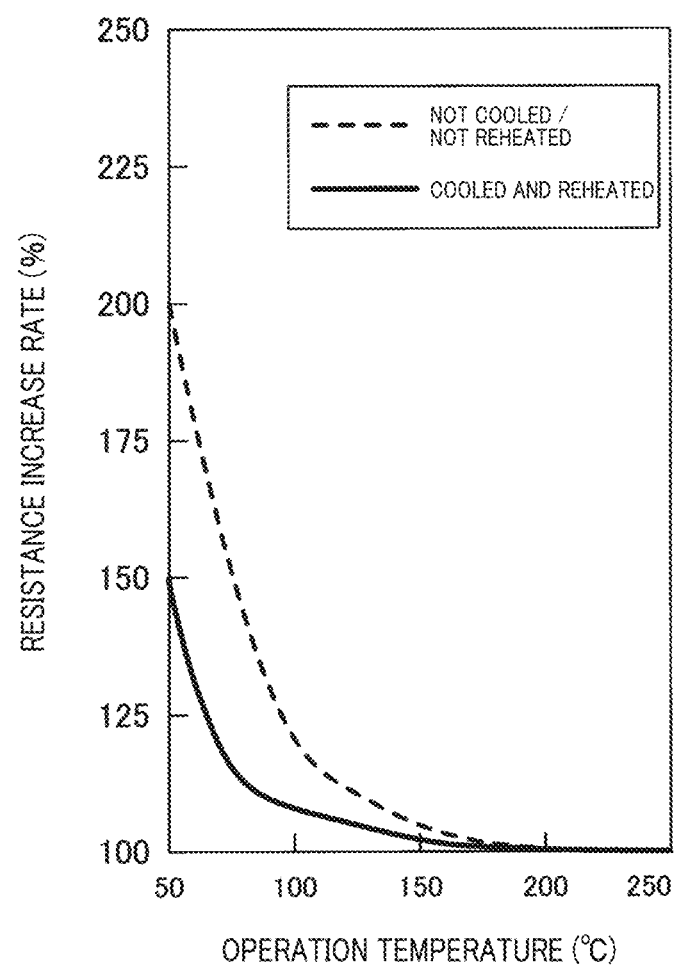
FIG. 27 is a diagram illustrating the relationship between the operation temperature and the resistance increase ratio in the case when the circulating solution was cooled and reheated and the case when the circulating solution was not cooled and reheated in Example 8.

As illustrated in FIG. 27, when the circulating solution was cooled and reheated, the resistance increase ratio became lower compared to when the solution was not cooled and reheated. Further, the adhesion of the deposited artificial synthetic resin was confirmed by the observation of the inner wall surface of the solution circulation flow channel provided with a cooling unit. According to this result, by using a configuration in which the cooling and reheating of the circulating solution is possible, it is possible to control the concentration of the artificial synthetic resin by circulating the solution, and it is possible to prevent the adhesion of the artificial synthetic resin to the anode surface when the concentration of the artificial synthetic resin is a high concentration.

Example 9

A flow cell type electrochemical cell was prepared in the same manner as Example 2, and connected with a solution circulation flow channel between the solution supply flow channel and the solution discharge flow channel A coating layer consisting of the ceramic layer was formed on the inner wall surface of the solution discharge flow channel. The ceramic layer contains Al and Si. Specifically, Cera Armor from Shine Kohgei Co., Ltd. was used in the ceramic layer. Further, for comparison, electrochemical cells in which the ceramic layer was not formed were prepared. These electrochemical cells were operated at an operation temperature of 200° C. for 24 hours. Moreover, the weight change amount of the solution discharge flow channel was determined and the amount of adhesion to the inner wall surface of the artificial synthetic resin was measured. It is to be noted that the artificial synthetic resin which was used was a polyvinyl alcohol. The results are illustrated in FIG. 28.

Figure 28:
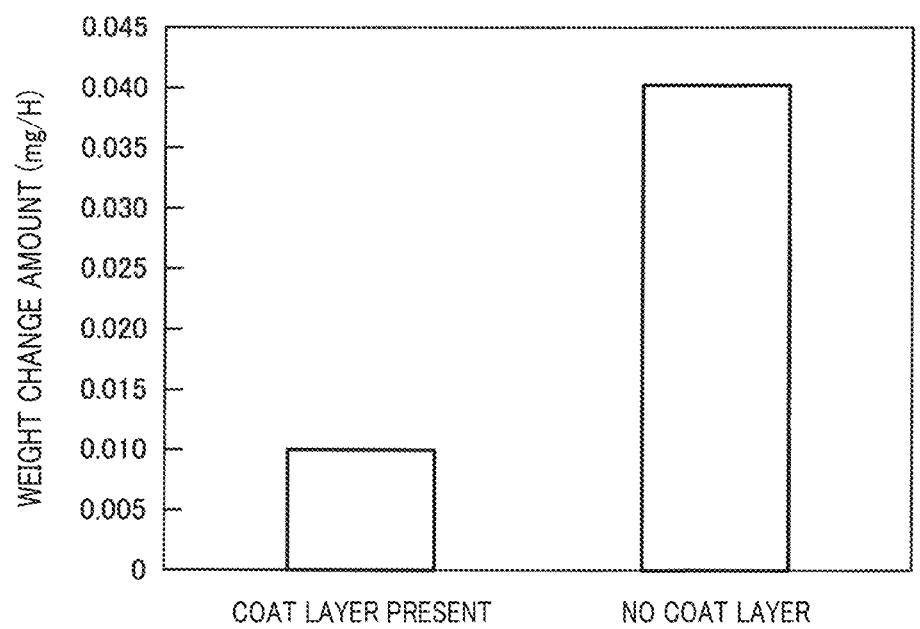
FIG. 28 is a diagram for comparing the amount of artificial synthetic resin adhering to the inner wall surface of the supply passage in the case when a coating layer was provided on the inner wall surface of the supply passage of the solution and in the case when the coating layer was not provided in Example 9.

As illustrated in FIG. 28, it was confirmed that by providing the coating layer on the inner wall surface of the supply passage of the solution, it becomes possible to prevent the undissolved artificial synthetic resin present in the solution from adhering to the inner wall surface of the supply passage of the solution. This effect can prevent clogging in the supply passage of the solution and the reduction of the concentration of the artificial synthetic resin, and is advantageous in improving the performance of the electrochemical cell.

The present disclosure is not limited to the each of the above embodiments and each of the examples, and various modified changes can be made without departing from the subject matter of the present disclosure. Further, each configuration illustrated in the each of the embodiments and each of the examples can be appropriately combined with each other.

What is claimed is:

1. An electrochemical device comprising an electrochemical cell provided with an electrolyte having proton conductivity, an anode provided on one side of the electrolyte, and a cathode provided on the other side of the electrolyte, and
configured so that a solution containing water, an artificial synthetic resin, and an acid is supplied to the anode.

2. The electrochemical device according to claim 1, wherein the acid contains phosphoric acid.

3. The electrochemical device according to claim 1, wherein the acid contains sulfuric acid.

4. The electrochemical device according to claim 1, wherein the solution is exposed to a temperature of 180° C. or more prior to being supplied to the anode.

5. The electrochemical device according to claim 1, wherein the solution is exposed to a temperature of 200° C. or more prior to being supplied to the anode.

6. The electrochemical device according to claim 1, further comprising
a solution contact flow channel with the anode disposed herein for contacting the solution to the anode, and
in a case where an edge of a supply side of the solution in the anode is the origin and an edge of a discharge side of the solution in the anode is X, a temperature adjustment unit which adjusts the temperature of the solution in the solution contact flow channel of the supply side of the solution with respect to the center part which is substantially located at X/2.

7. The electrochemical device according to claim 6, wherein the temperature adjustment unit adjusts the temperature of the solution in the solution contact flow channel of the supply side of the solution to 160° C. or more with respect to the center part.

8. The electrochemical device according to claim 1, further comprising
a stirring mechanism which stirs the solution prior to being supplied to the anode.

9. The electrochemical device according to claim 1, wherein the anode contains carbon particles having a carbonyl group, and
a pore volume distribution of the carbon particles has a peak pore size in the range of not less than 2 nm and not more than 200 nm.

10. The electrochemical device according to claim 1, wherein the anode contains carbon particles having a carbonyl group, and
a pore volume distribution of the carbon particles has a peak pore size in the range of not less than 2 nm and not more than 20 nm.

11. The electrochemical device according to claim 1, further comprising
a supply pressure adjustment mechanism which changes the supply pressure of the solution and supplies the solution to the anode, or a supply rate adjustment mechanism which changes the supply rate of the solution and supplies the solution to the anode.

12. The electrochemical device according to claim 1, further comprising
a solution circulation flow channel by which the solution which was not used at the anode is recirculated to the anode, wherein
the solution circulation flow channel comprises
a cooling unit which deposits and adheres the artificial synthetic resin in the solution by cooling, and
a reheating unit provided on the downstream side of the cooling unit for reheating the cooled solution.

13. The electrochemical device according to claim 1, further comprising
a coating layer which prevents the adhesion of the artificial synthetic resin to an inner wall surface of a supply passage of the solution.

14. An electrochemical device comprising an electrochemical cell provided with an electrolyte having proton conductivity, an anode provided on one side of the electrolyte, and a cathode provided on the other side of the electrolyte, and
configured so that a solution containing water, an artificial synthetic resin, and a mixture of acids is supplied to the anode, wherein:
the mixture of the acids contains phosphoric acid and sulfuric acid; and
the mass ratio of the phosphoric acid to the sulfuric acid in the mixture of the acids is in the range of 90:10 to 20:80.

* * * * *